United States Patent
Srack et al.

(10) Patent No.: US 7,376,492 B2
(45) Date of Patent: May 20, 2008

(54) SYSTEM FOR MEASURING POINTS ON A VEHICLE DURING DAMAGE REPAIR

(75) Inventors: Robert W. Srack, Salina, KS (US); Dwight Day, Manhattan, KS (US)

(73) Assignee: Matrix Electronic Measuring, L.P., Salina, KS (US)

(*) Notice: Subject to any disclaimer, the term of this patent is extended or adjusted under 35 U.S.C. 154(b) by 191 days.

(21) Appl. No.: 10/980,369

(22) Filed: Nov. 3, 2004

(65) Prior Publication Data

US 2005/0131586 A1  Jun. 16, 2005

Related U.S. Application Data

(63) Continuation-in-part of application No. 10/974,288, filed on Oct. 27, 2004, now Pat. No. 7,120,524.

(60) Provisional application No. 60/527,464, filed on Dec. 4, 2003.

(51) Int. Cl.
*G06F 15/00* (2006.01)
*G06F 17/00* (2006.01)
*G01M 17/00* (2006.01)

(52) U.S. Cl. .............................. 701/1; 701/29; 701/49; 33/288; 702/159

(58) Field of Classification Search .............. 701/1, 701/29, 30, 32, 33, 35, 49; 33/288, 293, 33/286; 356/614, 620, 139.1, 139.09, 139.05, 356/139.06; 702/33, 34, 35, 36, 40, 94, 95, 702/150, 152, 153, 158, 159
See application file for complete search history.

(56) References Cited

U.S. PATENT DOCUMENTS

| 4,329,784 A | 5/1982 | Bjork |
| 4,442,608 A | 4/1984 | Clausen |
| 4,490,918 A | 1/1985 | Clausen |
| 4,513,508 A | 4/1985 | Jarman et al. |
| 4,546,638 A | 10/1985 | Field |
| 4,598,481 A | 7/1986 | Donahue |
| 4,630,379 A | 12/1986 | Wickmann et al. |
| 4,811,250 A | 3/1989 | Steber et al. |
| 4,895,448 A | 1/1990 | Laird |
| 4,934,063 A | 6/1990 | Speisser |
| 4,997,283 A | 3/1991 | Danielson et al. |
| 5,029,397 A | 7/1991 | Palombi |
| 5,054,207 A | 10/1991 | Marshall |
| 5,175,601 A | 12/1992 | Fitts |
| 5,193,288 A | 3/1993 | Stifnell |
| 5,295,073 A | 3/1994 | Celette |
| 5,307,151 A | 4/1994 | Hof et al. |

(Continued)

*Primary Examiner*—Jack W. Keith
*Assistant Examiner*—Edward Pipala
(74) *Attorney, Agent, or Firm*—Polsinelli Shalton Flanigan Suelthaus PC

(57) ABSTRACT

A carriage moves back and forth under a vehicle and three cameras or laser fixed along one axis pivot in a common plane, utilizing two cameras at time to locate a target fixed to a reference point on the undercarriage of the vehicle. Triangulation calculations, combined with the location of the cameras provide the location of the reference point in space in a three-dimensional coordinate system and compare that location with a stored designed location of the reference point prior to the crash, allowing the vehicle structure to be returned to its designed shape by other equipment.

25 Claims, 19 Drawing Sheets

U.S. PATENT DOCUMENTS

| | | |
|---|---|---|
| 5,383,454 A | 1/1995 | Bucholz |
| 5,505,000 A | 4/1996 | Cooke |
| 5,515,613 A | 5/1996 | Hinson |
| 5,532,816 A | 7/1996 | Spann et al. |
| 5,612,905 A | 3/1997 | Maillart et al. |
| 5,622,170 A | 4/1997 | Schulz |
| 5,644,854 A | 7/1997 | Bergeron |
| RE35,816 E | 6/1998 | Schulz |
| 6,040,910 A | 3/2000 | Wu et al. |
| 6,100,984 A | 8/2000 | Chen et al. |
| 6,115,927 A | 9/2000 | Hendrix |
| 6,165,181 A | 12/2000 | Heilbrun et al. |
| 6,601,309 B1 | 8/2003 | Hedstrom |
| 2002/0002330 A1 | 1/2002 | Vilsmeier |
| 2002/0029128 A1 | 3/2002 | Jones et al. |
| 2002/0038084 A1 | 3/2002 | Pelzer et al. |
| 2002/0087075 A1 | 7/2002 | Bucholz |
| 2002/0104390 A1 | 8/2002 | Jones |

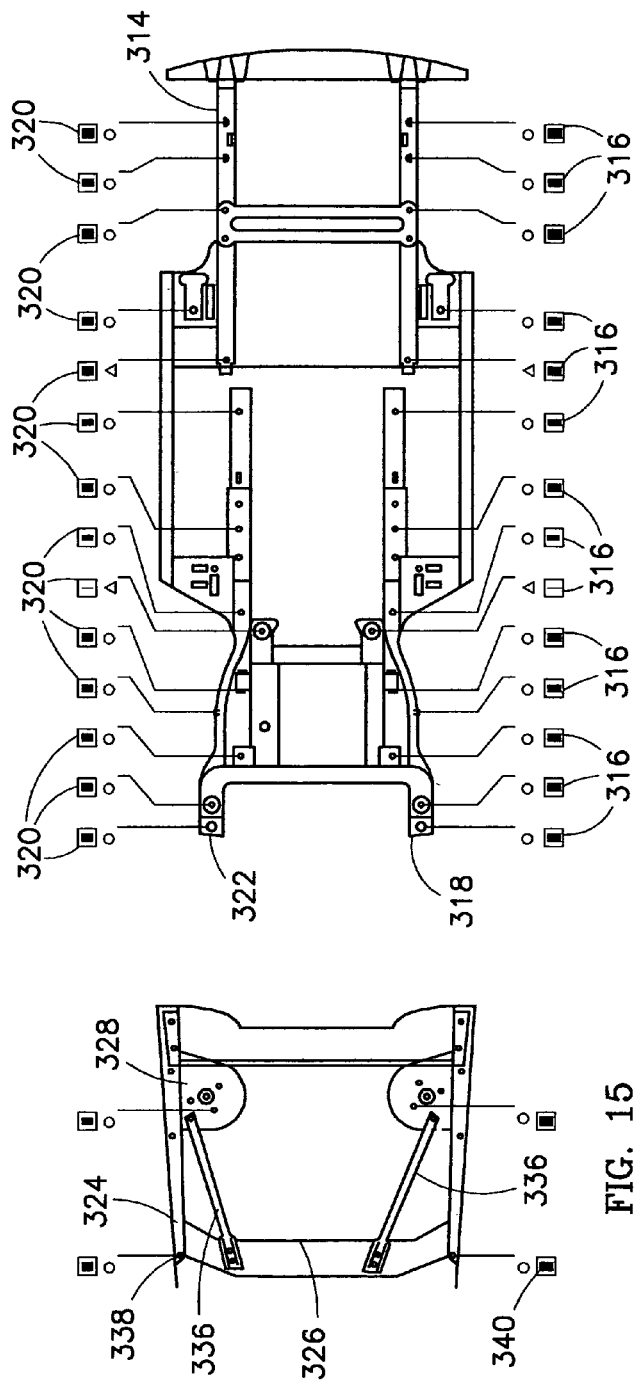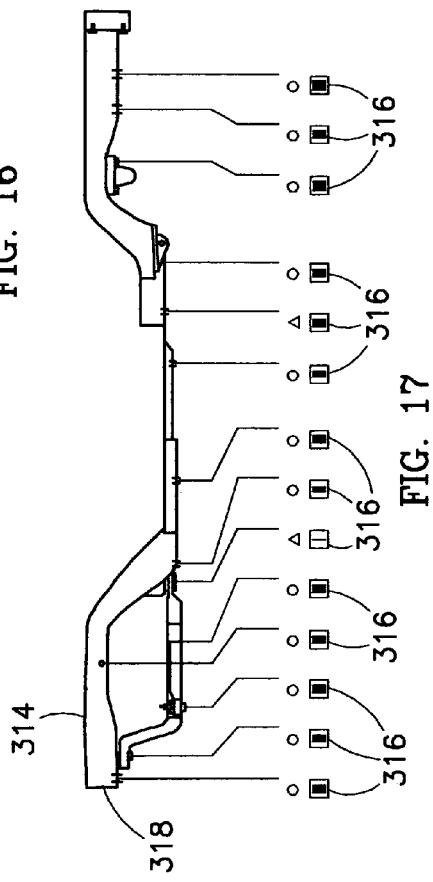
FIG. 15
FIG. 16
FIG. 17

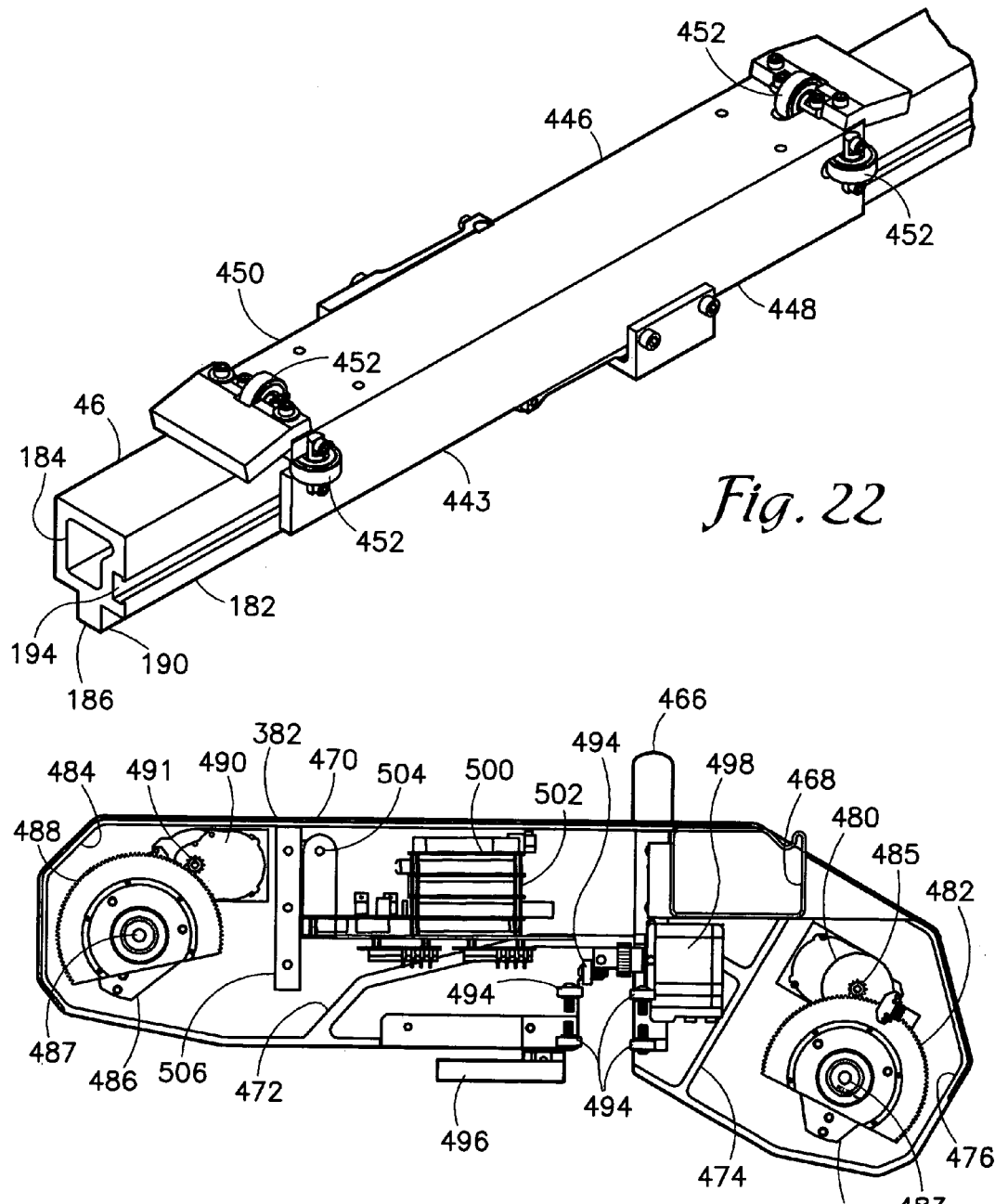

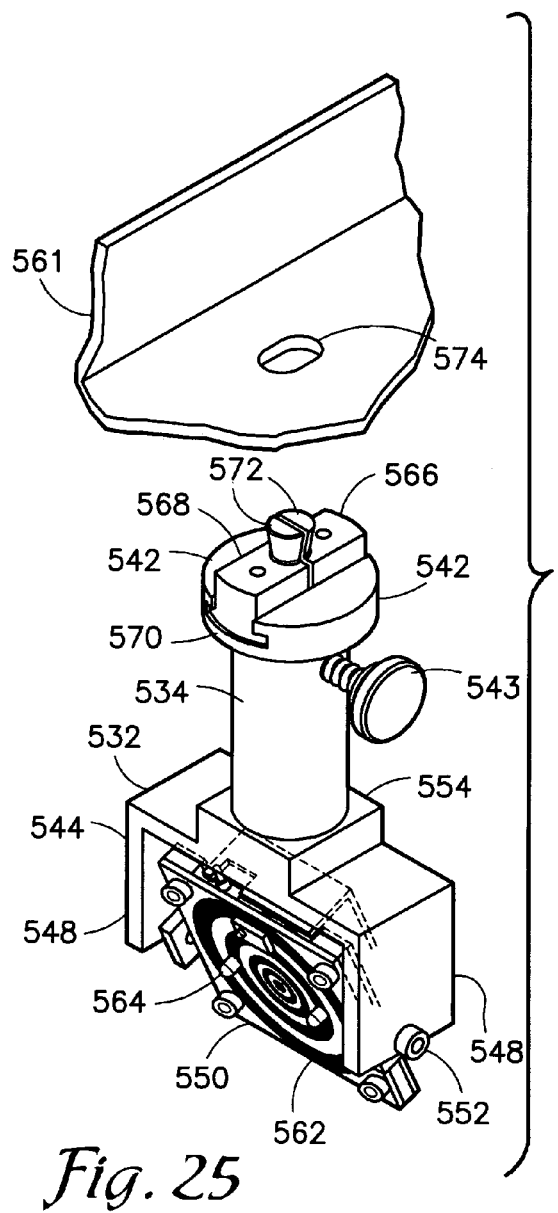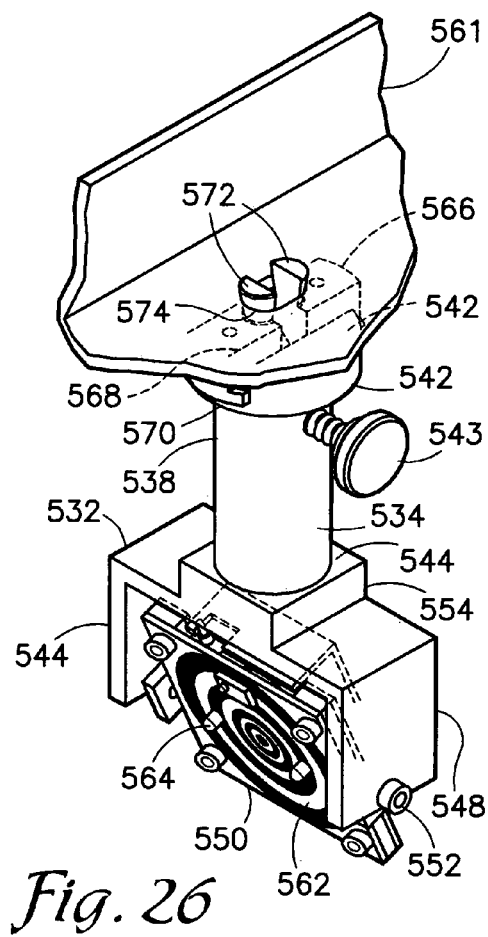
Fig. 25
Fig. 26

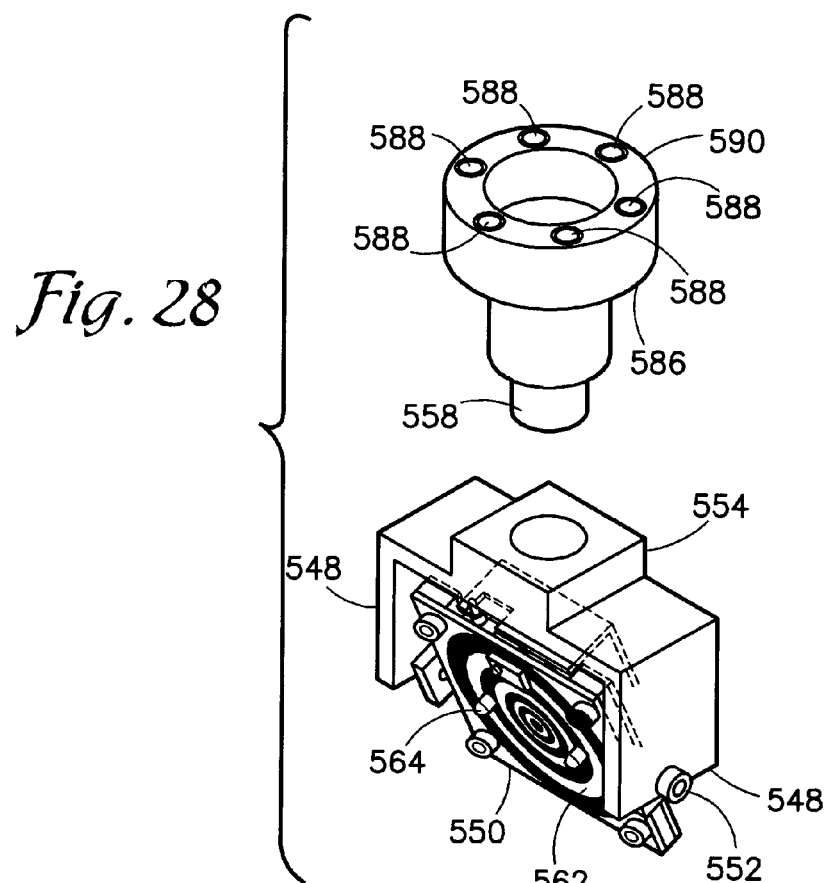
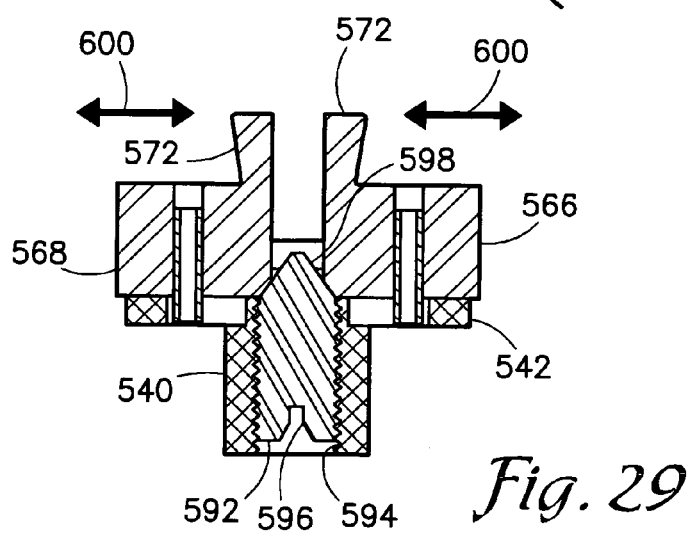
Fig. 28
Fig. 29

SYSTEM FOR MEASURING POINTS ON A VEHICLE DURING DAMAGE REPAIR

CROSS-REFERENCE TO RELATED APPLICATIONS

This application is a continuation-in-part of a regular United States Patent Application of the same title filed on Oct. 27, 2004, application Ser. No. 10/974,288 now U.S. Pat. No. 7,120,524, which claims priority under 35 U.S.C. § 119 (e)(1) from U.S. Provisional Patent Application, application No. 60/527,464, filed Dec. 4, 2003. The attached text and drawings includes the exact material filed on Oct. 27, 2004, with new matter added. The inventors are identical in the earlier filed provisional patent application, the regular patent application claiming priority from the provisional patent application and the present continuation-in-part application.

STATEMENT REGARDING FEDERALLY SPONSORED RESEARCH OR DEVELOPMENT

Not applicable.

BACKGROUND OF THE INVENTION

The present invention is related to an apparatus and process for determining the location of a point in space and measuring the deviation of that location from a desired position. More particularly, the preferred embodiment of the present invention is directed to measuring the deviation of certain points on a damaged motor vehicle from their proper location to facilitate the repair of the vehicle.

DESCRIPTION OF THE RELATED ART INCLUDING INFORMATION DISCLOSED UNDER 37 C.F.R. 1.97 and 1.98

When motor vehicles are damaged in collisions or wrecks, the structures of the vehicle, particularly those providing structural integrity to the vehicle, are often bent or otherwise deformed. To restore proper handling of the vehicle, its structure must be returned to its designed configuration. To accomplish this, certain points on the vehicle, principally on the undercarriage or chassis, but also on the vehicle's body, are measured in relation to one or more fixed reference points, such as the location of the measuring equipment and those measurements are compared to a database containing the location of those same points on an undamaged vehicle of the same make and model. Through this comparison, the distance and direction of the deviation of a particular point on the vehicle chassis or body from the design location is calculated. Then pulling equipment, which is not part of the present invention and which is not illustrated herein, is used to bend the chassis back into its more or less original configuration and alignment, with repeated measuring of the deviation of the reference points from their desired locations made throughout the process.

Because the vehicle collision repair industry is very large, many extensive efforts to address measuring the deviations of selected points on the chassis of a wrecked vehicle with the desired locations of these points and these efforts have led to a number of patents, a few of which are discussed below. All of these prior art systems have failings that inhibit their widespread use and industry approval.

Bjork, U.S. Pat. No. 4,329,784, for example relies on a physical coordinate system with measuring marks, that is, rulers, inscribed on the measuring frame members, with the worker merely reading the numbers that are adjacent to the reference point. This system allows for errors in setting up the rulers and in reading the measurements and is very time consuming and laborious.

Bucholz, U.S. Patent Application Publication Number 2002/0087075 A1, discloses a "System for Indicating the Position of a Surgical Probe within a Head on an Image of the Head" comprising computer software to plot the location of a probe inside a patient's head which utilizes sound emitters and microphone detectors, or, alternatively, infrared emitters and detectors, Reference pins may be affixed to the skull to determine the position of the patient's head during surgery. The emitters are rapidly energizing the emitters one at a time in a predetermined sequence and then measuring the time required for the individual sound to reach each of the microphones 350 in the array 300. A three dimensional digitizer controls this process. The ambient noise in vehicle repair shops interferers with any type of acoustic signals.

Vilsmeier, U.S. Patent Application Publication Number 2002/0002330 A1, discloses a "Referencing or Registering a Patient or a Patient Body Part in a Medical Navigation System by Means of Irradiation of Light Points" comprising shining a light beam, preferably from an infrared laser onto a patient to produce a spot of light, which replaces a conventional marker. About twenty light spots are created, which are recognized by a pair of spaced infrared cameras both mounted on a camera mount. The cameras appear to be stationary relative to one another and are only moved, along with the whole camera mount, when needed to get out of shadows, such as from the patient's nose, and then the movement of the camera mount is recorded indirectly through measurements of reflected light from the reference adapter, which is a three reflector indexing monitor. The cameras take a large number of images, which are manipulated by a computer to determine the shape of the patient's face. This system is inadequate for present purposes because in vehicle repair, the reference points are given by the manufacturer or others and cannot be selected by the user. Further these reference points are principally underneath the vehicle and cannot be conveniently illuminated or otherwise located from a single fixed source.

These references do not disclose a measurement system that utilizes multiple cameras to provide triangulation calculations that are based on the two camera closer to the reference point; that automatically moves the sensor cameras to a location proximate to the relevant reference point; that utilizes a target searching routine to center the cameras on a target and reports when the target has been centered in the camera's field of view.

BRIEF SUMMARY OF THE INVENTION

Accordingly, it is a primary object of a system for measuring points on a vehicle during damage repair according to the present invention to that utilizes multiple cameras to provide triangulation calculations that are based on the two camera closer to the reference point.

It is a further object of the system for measuring points on a vehicle during damage repair according to the present invention that automatically moves the sensor cameras to a location proximate to the relevant reference point.

It is a further object of the system for measuring points on a vehicle during damage repair according to the present invention that It is a further object of the system for measuring points on a vehicle during damage repair according to the present invention that utilizes a target searching routine to center the cameras on a target and reports when the target has been centered in the camera's field of view.

The system for measuring points on a vehicle during damage repair utilizes encoder motors, sometimes called servos, which rotate a drive shaft in fine, measurable increments, such as 2,000 increments per revolution, to rotate at least two cameras fixed in a single plane and along the same line until they are centered on a target that includes concentric rings of light and dark circular patterns and calculates the location of the point through well-know standard triangulation techniques based on the law of sines using custom computer software. The at least two cameras are spaced from one another by an equal fixed amount along a spacer bar. The spacer bar may be mounted for precisely measured movement along a particular axis.

Preferably, two separate measuring units are set up around the vehicle, including a front-end measuring unit and an undercarriage measuring unit that lies on the floor or other structure parallel to the plane of the undercarriage of the vehicle and travels back and forth underneath the vehicle. Each of these measuring units will locate one or more targets affixed to specific points on the vehicle 16, measure the location of the each point in space, compare the location of each point to its designed location relative to an index or reference point, and calculate the deviation of each target point from its designed location, noting both direction a three-dimensional grid measuring system, which may conveniently be a xyz coordinate space and display this information in a format that can be used by a repairman. These calculations are made many times as the vehicle is pulled or otherwise reformed to its designed specifications.

Other objects and advantages of the present invention will become apparent from the following description taken in connection with the accompanying drawings, wherein is set forth by way of illustration and example, the preferred embodiment of the present invention and the best mode currently known to the inventor for carrying out his invention.

BRIEF DESCRIPTION OF THE SEVERAL VIEWS OF THE DRAWINGS

FIG. 13 is a schematic bottom view of an automobile chassis.

FIG. 14 is a schematic side view of the automobile chassis of FIG. 13.

FIG. 15 a schematic top view of the front end of the automobile chassis of FIG. 13 with the automobile hood removed.

FIG. 16 is an isometrically displayed three-dimensional graph showing a plot of the error in computing the x location of a point to be measured in an xyz coordinate system using a 2,000 encoder.

FIG. 17 is an isometrically displayed three-dimensional graph showing a plot of the error in computing the y location of a point to be measured in an xyz coordinate system using a 2,000 encoder.

FIG. 22 is an isometric view of the ladder rail engaging system for the undercarriage measuring unit of FIG. 1 illustrating the floating bearing suspension arrangement for the ladder rail drive system of FIG. 4.

FIG. 23 is a side view of an upper carriage assembly shown with the front frame member removed to reveal internal components.

FIG. 25 is an isometric view of an alterative embodiment of the target locating assembly of FIG. 5.

FIG. 26 is an isometric view of a the target locating assembly of FIG. 25 showing the target locating assembly installed on the chassis of a vehicle or the like.

FIG. 28 is an exploded isometric view of the target locating assembly of FIG. 25 showing an alternative mounting assembly for securing the target locating assembly onto a metallic ferrous body.

FIG. 29 is a cross section of FIG. 27 taken along lines 29-29 illustrating the operation of the hole mounting centering apparatus of the target locating assembly.

DETAILED DESCRIPTION OF THE INVENTION

Figure 1:
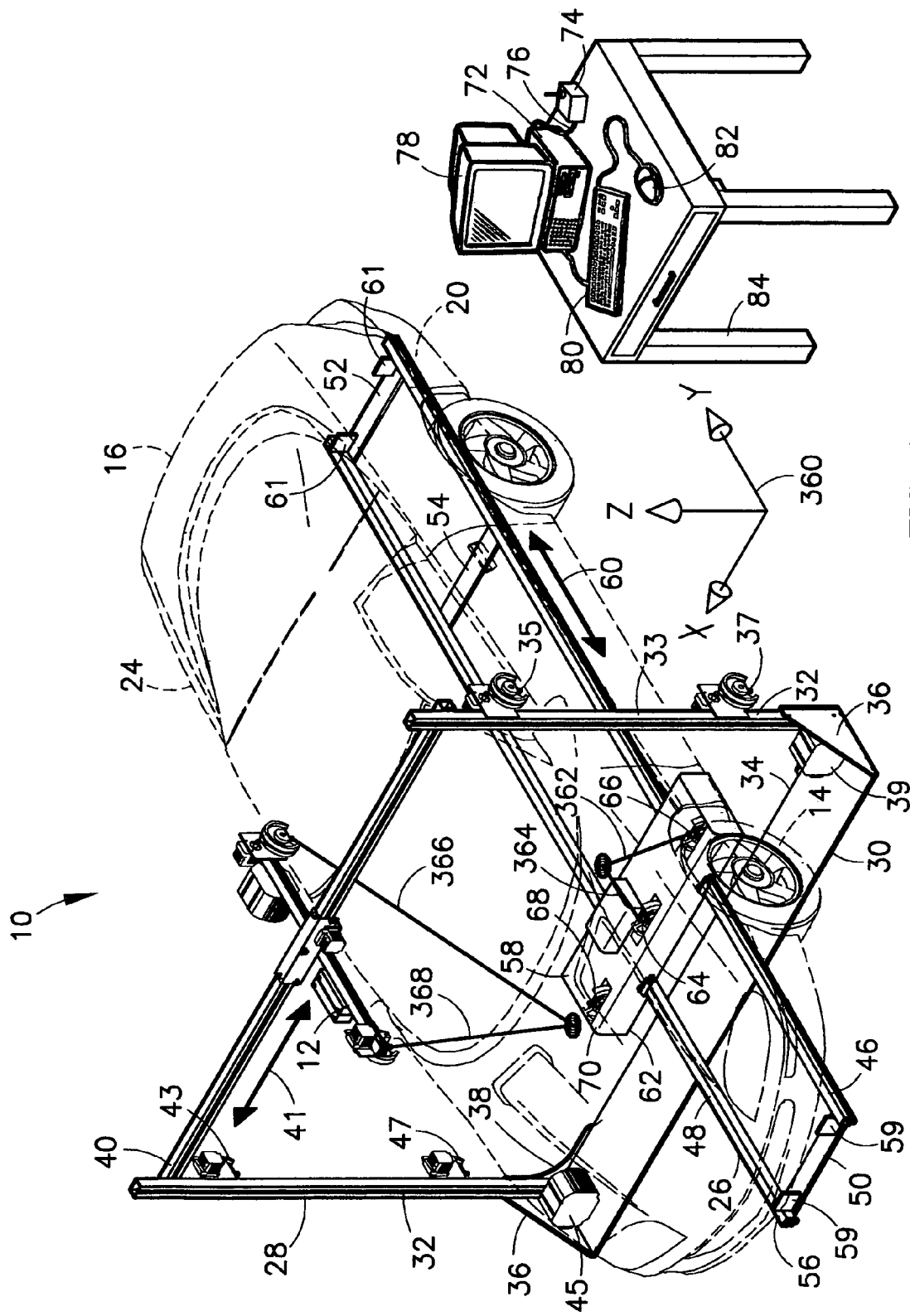
FIG. 1 is an isometric view of a system for measuring points on a vehicle during damage repair according to the present invention shown in use with an automobile and showing the remotely located computer and stand.

Referring to FIG. 1, the system for measuring points on a vehicle during damage repair, or vehicle measuring system 10, includes four different assemblies for measuring points on a vehicle, thereby providing measurement data for nearly the entire vehicle without having to rearrange or move a particular data collection system. A front-end measuring unit 12 is placed approximately in the proximity of the front wheels 14 of the vehicle 16, with the upright frame 28 being perpendicular to the longitudinal centerline of the vehicle 16. The driver's side 20 of the vehicle 16 is defined as the side of the vehicle 16 that is closest to the driver when he is in the driver's seat and the passenger's side 24 is defined as the side of the vehicle 16 that is closest to a passenger in the passenger's seat adjacent to the right-hand side of the vehicle 16 as referenced from the driving position in the car. The second measuring unit is an undercarriage measuring unit 26, which lies flat on the floor underneath the vehicle 16 or another rigid flat surface parallel to the plane of an undeformed vehicle 16 (hereinafter "floor" or "shop floor").

The front-end measuring unit 12, is mounted on a upright frame 28, each of which is identical, except for the horizontal cross member 40. The upright frame includes a flat base plate 30 placed on the shop floor, with the base plate 30 having a rectangular shape wide enough to span the width of the vehicle 16 and a pair of spaced vertical support members, a driver's side vertical support member 32 and a passenger's side support member 33 connected at their lower ends to the outer corners of the rear edge 34 of the base plate 30 by bolting or the like and reinforced by the large gussets 36 and the small gussets 38, which are also bolted together. A horizontal cross member 40 is fixed to the upper ends of the two vertical support members 32, 33 of the front end measuring unit. by screws or the like and the measuring unit 18. as appropriate is connected to the horizontal cross member 40, resulting in a measuring unit 18 that is suspended above the shop floor so that the relevant measuring unit 18 can look down on the vehicle 16 body or upper portions of the vehicle 16. The horizontal cross member 40 includes flanges and teeth for gear and pinion reciprocal travel of the measuring unit 18 along it, as shown by the double-headed arrow 41. The drive mechanism for reciprocating the front-end measuring unit 12 along the horizontal cross member 40 is described in detail below.

Mounted on the driver's side vertical frame member 32 is an upper target locating assembly 35 and a lower target locating assembly 37, which are powered and controlled by the combined control module and battery assembly 39, which is electrically connected to the target locating assembly. Mounted on the passenger's side vertical support member 33 is lower passenger's side target locating assembly 47 and an upper target locating assembly 43, both operatively connected to the combined control module and battery 45. All of these target locating assemblies 35, 37, 47, 43 are the target locating assemblies 213 of FIG. 5 or 13, i.e., they can utilize lasers or cameras and rotate in a plane about an axle, see below.

Still referring to FIG. 1, the undercarriage measuring unit 26 includes a pair of spaced apart parallel rails, which are a driver's side rail 46 and a passenger's side rail 48, which are laid on the shop floor and are maintained in their spaced parallel relationship by a front cross brace 50, a rear cross brace 52 and an intermediate cross brace 54, which lies between the front cross brace 50 and the rear cross brace 52, all lying on the shop floor and each brace including two ends, one of which is fastened to the respective rails 46, 48 by any conventional means. This number of cross braces is sufficient to maintain the rails 46, 48 in their parallel relationship and to prevent them from spreading apart under a moderate vertical load. The rails 46, 48 and the cross braces 50, 52, 54 form a ladder track assembly 56 that is placed underneath the vehicle 16 basically along the centerline of the vehicle 16 chassis and that carries a measuring carriage 58, which is mounted on the ladder track assembly 56 for reciprocal movement along the ladder track assembly 56 along the direction of the double-headed arrow 60. The driver's side rail 46 includes a gear rack that is engaged by a pinion on the measuring carriage 58 for driving the measuring carriage 58 along the ladder track assembly 56 in precisely measured increments to move the measuring carriage 58 into position to find specific points of interest on the underside of the vehicle 16, as explained in more detail below.

The measuring carriage 58 includes a measuring carriage chassis 62, that holds measuring instruments and related circuitry including a centerline camera 64, a driver's side camera 66 and a passenger's side camera 68, which lie along the same line and each of which can be rotated in precisely measured increments about a separate axis that is perpendicular to the line the cameras lie along and is horizontal. A housing 70 covers the equipment on the measuring chassis 62, except the cameras 64, 66, 68 and some camera rotation elements, which protrude through slots in the housing 70.

The conventional personal computer 72 is operatively connected to a wireless transmitter and receiver 74 by the cable 76 for receiving wireless signals from a similar transmitter and receiver located inside the housing 70. The personal computer and associated computer display 78, keyboard 80 and computer mouse 82 may be conveniently placed on the table 84 or the like, away from the vehicle 16. Alternatively, cables could be run from the measuring carriage 58 to the personal computer 72, but this alternative clutters the shop floor and could interfere with travel of the measuring carriage 58. The electronic signals from the measuring carriage 58 communicate the position of the measuring carriage 58, the rotational position of the cameras and the location of a target on the vehicle 16, once acquired, to the computer 72, which calculates the absolute position of each target in space from the raw data and then compares that position to a desired position, which has been previously stored in a database available to the computer 72, all of which is explained in greater detail below.

Figure 2:
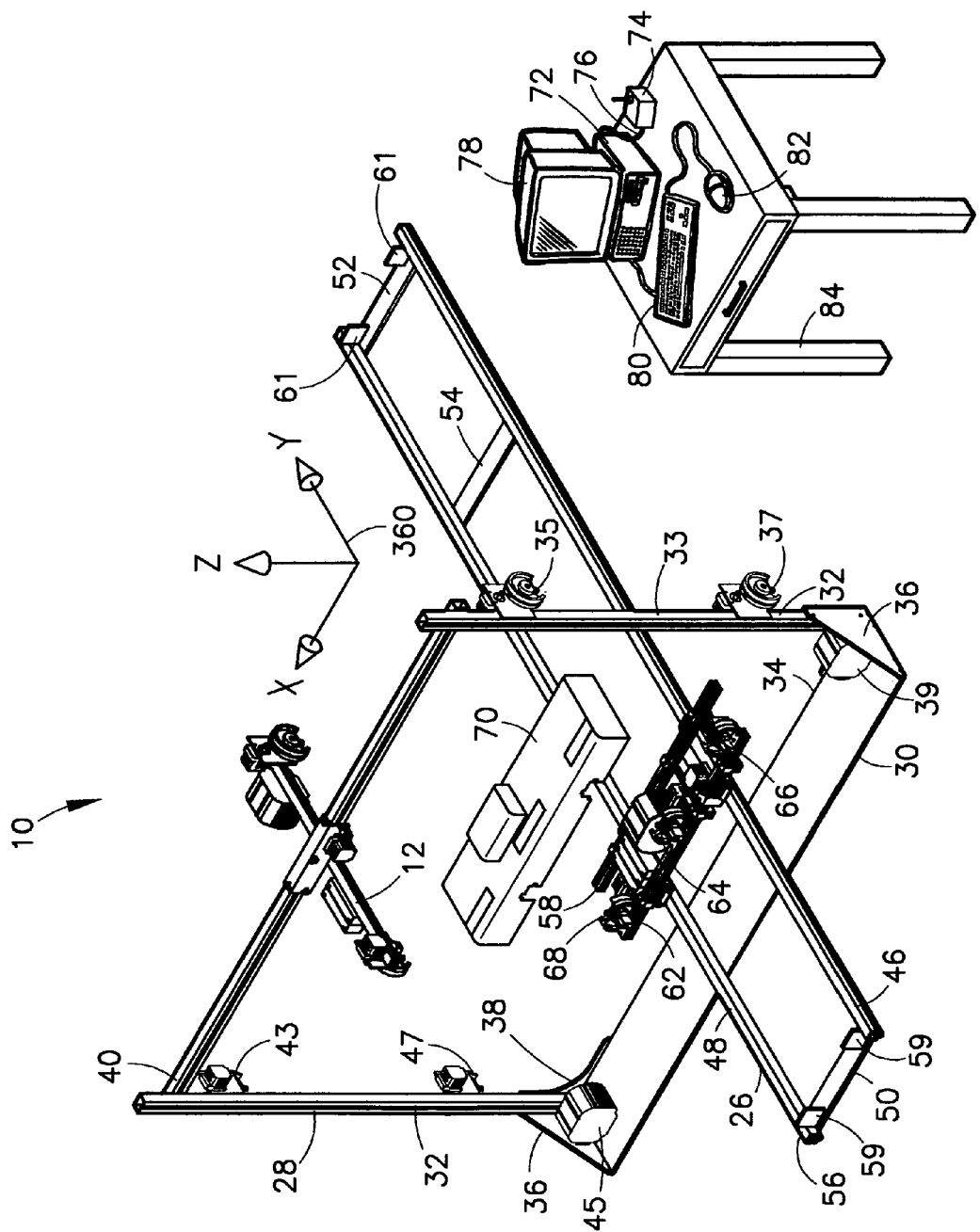
FIG. 2 is an isometric view of the system for measuring points on a vehicle during damage repair of FIG. 1 shown without the motor vehicle.
Figure 3:
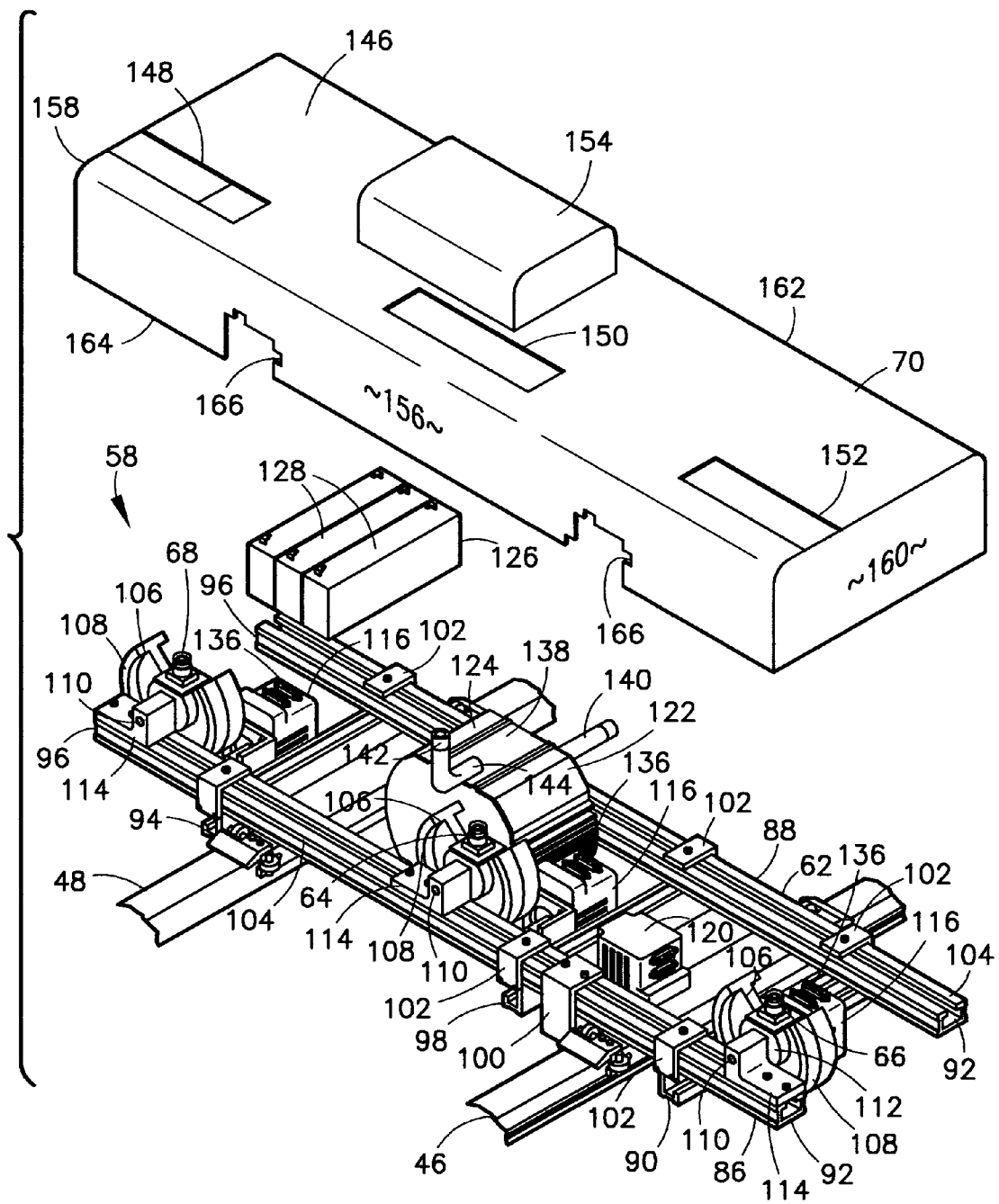
FIG. 3 is an isometric view of the lower instrument, undercarriage measuring unit, of the system for measuring points on a vehicle during damage repair of FIG. 1 shown with the housing exploded from the assembly.

Referring to FIGS. 2, 3, the measuring carriage 58 chassis 62 includes a front U-shaped frame member 86 and a rear U-shaped frame member 88, which are held in spaced parallel relationship in the same plane by the driver's side cross brace 90 located adjacent to the driver's side ends 92 of the frame members 86, 88, but inward of the driver's side camera 66, the passenger's side cross brace 94, located adjacent to the passenger's side ends 96 of the frame members 86, 88, but inward of the passenger's side camera 68 and the intermediate cross brace 98, located inwardly of the driver's side rail 46 of the ladder track assembly 56. Each of the cross braces 90, 94, 98 includes a main brace body 100 that lies under the frame member 86, 88, and an up-turned bracket 102 on each end that lies along and is fastened to the top surface 104 of each of the front and rear frame member 86, 88.

Each camera 64, 66, 68 is mounted in the notch 106 of a separate but identical pulley wheel 108, each of which is mounted for axial rotation about an axle 110 through the center 112 of each pulley wheel 106, with each end of each axle 108 mounted for rotational movement in an axle mounting bracket 114, which is fixed the top surface 104 of the front U-shaped frame member 86. The axle mounting bracket 114 may include a bearing, such as a sleeve bearing or ball or roller bearings and suitable lubrication with the axle 110 rotating within the aperture in the axle mounting bracket 114 and being fixed in relation to the pulley wheel 106. Each camera 64, 66, 68 is fixed into the bottom of a notch 106 by screws, adhesive or the like. Each pulley wheel 106 is operatively connected to a separate servo motor, or encoder 116 by a cable 118 that is wrapped around the drive shaft of the encoder 116 and around the outer perimeter of the pulley wheel 106, shown and explained in greater detail in FIG. 5 below. An encoder is an electric motor whose drive shaft can be rotated in precisely measured increments, for example up to 2,000 units of movement per rotation of the drive shaft in the present application, and the position of the encoder axle is known at every moment through a feedback signal to a computer. Encoders are commonly used in manufacturing when articles must be moved by precise amounts. A fourth encoder, the drive motor encoder 118, drives the measuring carriage 62 back and forth along the ladder track assembly 56, as shown and described in greater detail in connection with FIG. 4 below. All the encoders 116, 118 are identical.

Figure 9:
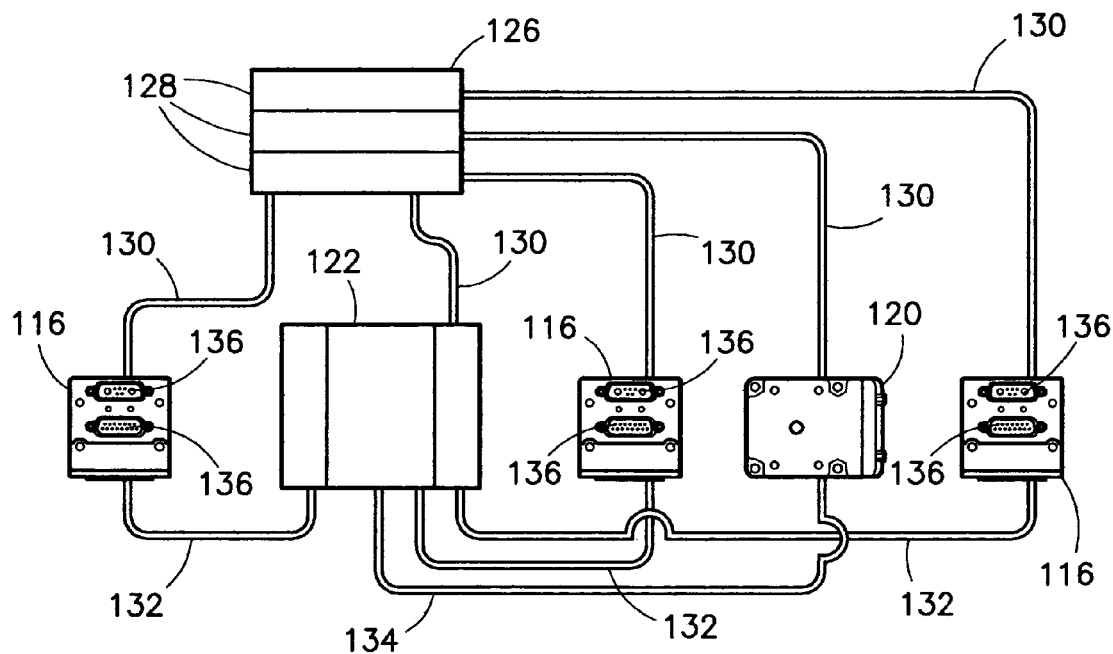
FIG. 9 is a basic electrical schematic showing the connections between the battery, camera movement encoders, and drive motor encoder according to the system for measuring points on a vehicle during damage repair according to FIG. 1.

Seated approximately in the middle of the measuring carriage 58 is the control module 122, which includes the control module housing 124 that covers the control module parts, shown in detail in FIG. 6 and described below. As shown in FIG. 9, all the electrically operated components of the measuring carriage 58 are powered by a rechargeable sealed lead-acid 36 volt battery 126, containing three identical electrical cells 128 electrically connected together to form the battery 126. The battery 126 is electrically connected to the control module 122, and the encoders 116, 118 by the electrical cables 130 (See FIG. 9). Each encoder 116 is connected to the control module by electrical data transfer cables 132, with the drive motor servo or drive motor encoder 120 connected by the drive motor data transfer cables 134. Each electronic data transfer cable 132, 134 includes many pairs of wires and is connected to ports 136 (also FIG. 3) that are similar to conventional personal computer printer cables. One or more, and typically two, separate ports are provided for separate cables on each encoder. Each electronic data transfer cable disclosed herein, including 132, 134 and all others discussed below, is bidirectional and full duplex.

Mounted on the top surface 138 of the control module housing 124 is a horizontal laser pen 140, and in the middle of the measuring carriage 58, which projects a visible beam of laser light horizontally and toward the rear of the vehicle 12 as seen in FIG. 1. This allows an operator to check the alignment of the measuring carriage 58 and the ladder rack assembly 56 to insure that the midpoint of measuring carriage 58 lies along the centerline of the vehicle 12 chassis or other convenient longitudinal axis and that the measuring carriage 58 will run back and forth along the ladder rack assembly 56 with the midpoint of the measuring carriage 58 running under the centerline of the vehicle 12 chassis throughout its travel. The midpoint of the measuring carriage 58 is defined as the point that is equidistant between the driver's side ends 92 and the passenger's side ends 96 of the frame member 86 or 88.

A vertically projecting vertical laser pen 142 continuously projects an exactly vertical visible beam of laser light upwardly along the midpoint of the measuring carriage 58, is mounted on a laser mounting bracket 144 positioned such that the upward projecting beam of laser light is in the same plane as the cameras 64, 66, 68. The vertical laser pen 142 allows the operator to determine when the camera line is aligned directly under points of interest on the vehicle 16 chassis. If desired, the vertical laser pen 142 can be installed so as to sweep continuously along the line defined by the camera 64, 66, 68 to provide a marking line visible due to persistence of vision. Both the horizontal laser pen and the vertical laser pens 140, 142 are continually energized and projecting a laser beam whenever the measuring carriage 58 is turned on and both project a beam of light wherein the beam itself is visible to the human eye along the length of the beam, providing a reference line, but are not strong enough to damage anyone's eyes.

Still referring to FIGS. 2, 3, the housing 70 includes a top wall 146 having a passenger's side slot 148 to accommodate the passenger's side camera 68, a centerline slot 150 to accommodate the centerline camera 64 and a driver's side slot 152 to accommodate the driver's side camera 66. A control module top housing 154 projects upwardly from the top wall 146 to accommodate the control module housing 124 and is sealed as to the top wall 146. The housing 70 further includes a front wall 156, a passenger's side wall 158, a driver's side wall 160 and a rear wall 162, which are each joined at their appropriate edges to form a basically rectilinear housing 70. The front wall 156 has a lower edge 164, which includes two spaced apart identical irregular openings 166 that accommodate the rails 46, 48. This construction allows the housing to seat down onto the measuring carriage 58 as far as practical to prevent dust and debris that may fall from the vehicle 16 during pulling and the like from contaminating the measuring carriage 58, which could damage the components, gum up gears, short out circuits or the like. The slots 148, 150, 152 and the irregular openings 166 may also be fitted with felt or rubber gaskets about their perimeters to reduce the changes of interior contamination further. The housing may be fastened to the measuring carriage chassis 62 by screws or the like.

Figure 4:
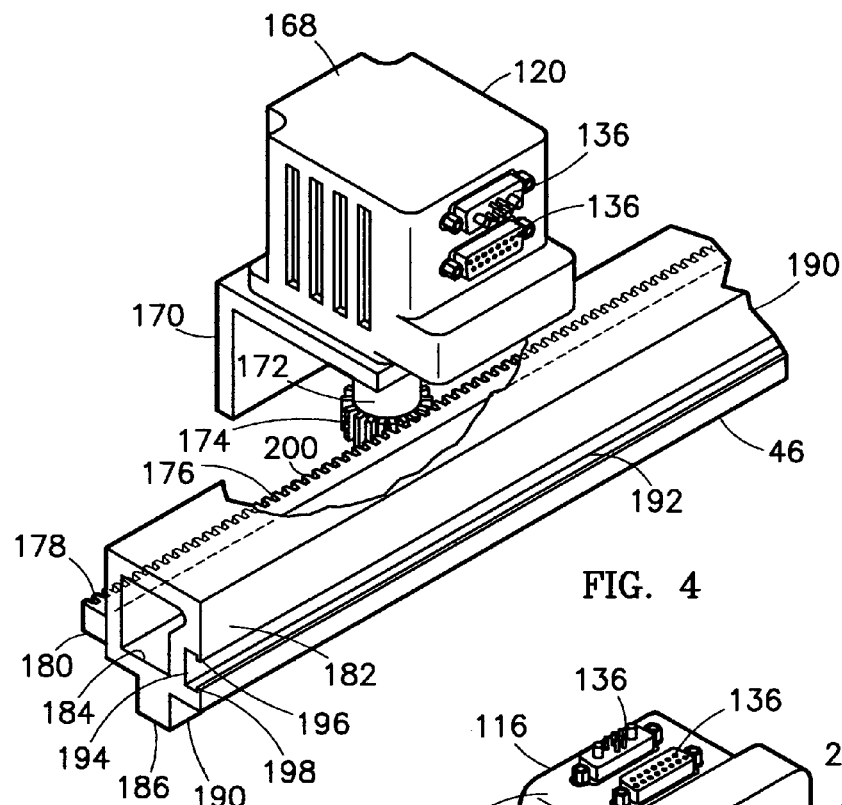
FIG. 4 is an isometric view of the drive mechanism of the lower instrument carriage of FIG. 3.

Referring to FIG. 4, the drive motor encoder 120 includes an encoder housing 168 which is fixed to the encoder housing bracket 170, which in turn is fixed to the appropriate cross brace 90, 94, 98. The encoder housing 168 also includes two data transfer connector ports 136. An encoder drive shaft 172 includes a circular toothed drive gear 174 at its distal end, which engages a toothed rack 176, which is formed on an outer edge 178 of a horizontally projecting flange portion 180 along the driver's side rail 46. The flange portion 180 projects inwardly toward the centerline of the vehicle 16 and is horizontal. The driver's side rail 46 includes a basically tubular body portion 182 having a basically square cross section and basically square cross section 184 opening throughout its length. The driver's side rail further includes a depending square cross section bottom portion 186 having a flat bottom surface 188, which rests on the shop floor. The bottom portion 186 is narrower than the tubular body portion 182 and is centered across the width of the tubular body portion 182 and serves as reinforcement, as well as a means for keeping the measuring carriage 58 from contacting the shop floor. On the outer side 190 of the driver's side rail 46 is a recessed track 192 includes a U-shaped horizontally disposed channel 194 having an upper depending flange portion 196 and an upwardly projecting lower flange portion 198, which effectively narrow the recessed track 192 along the outer side 190 of the driver's side rail 46, thereby locking rotational wheels into the recessed track 192. The toothed rack includes a plurality of teeth 200 that mesh with the drive gear 174 and it runs the entire length of the driver's side rail 46.

Figure 5:
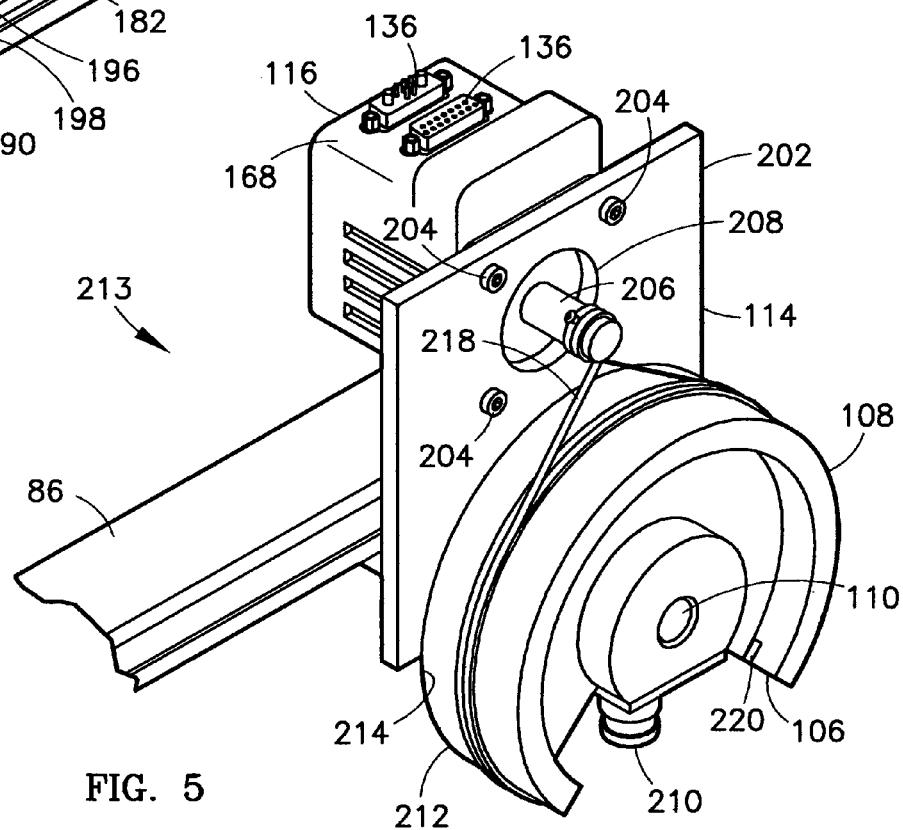
FIG. 5 is an isometric view of a target locating assembly utilizing a camera of the lower instrument carriage of FIG. 3 and the upright front measuring unit of FIG. 1.
Figure 11:
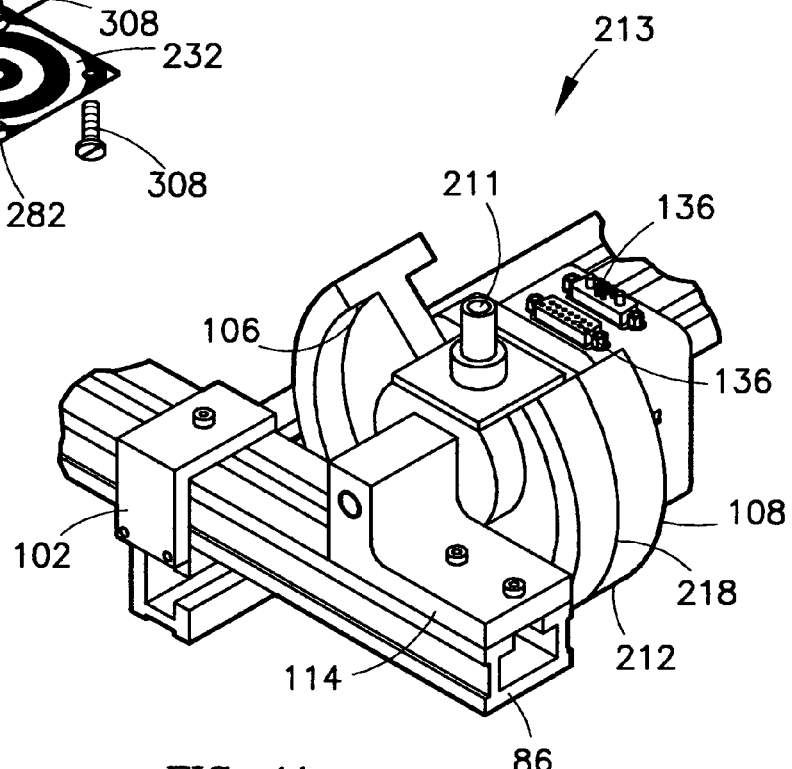
FIG. 11 is an isometric view of a an alternative embodiment of a target locating assembly utilizing a laser in place of the camera shown in FIG. 5.

Referring to FIG. 5, each camera actuating encoder 116 are the same unit as the drive motor encoder, but the final drive mechanism is different. The encoder 116 is fixed to a vertically oriented mounting plate 202, which is the axle mounting bracket 114 of FIGS. 2, 3 shown in more detail, by four machine screws 204, with the drive shaft 206 projecting through the aperture 208. The mounting plate 202 also carries the axle 110 upon which the pulley wheel 108 is mounted for limited rotational movement about the axis defined by the axle 110. The camera 210 (which is any camera described in this specification as mounted for rotation, including for example, the driver's side camera 66, passenger's side camera 68 and the centerline camera 64). As shown in FIG. 11, the camera 210 can be replaced with the laser 211 in any of the target locating assemblies 213.

The pulley wheel 108 includes a prominent large outer flywheel flange portion 212 to increase its angular momentum and reduce jerky motion and formed into the outer surface 214 of the circumference of the flywheel portion 212 lie a pair of circumferential grooves 216 that receive a drive belt 218 having an end fastened to a edge of the notch 106 by the fastening bracket 220. The opposite end of the drive belt 218 is similarly fastened to the other side of the notch 110. The drive belt 218 is wrapped around the drive shaft 206 twice. This arrangement magnifies the distance that the cameras 210 rotate due to the mechanical advantage of the pulley wheel 108 by a factor in the range of 80:1 to 150:1, with the preferred rotational movement advantage being 100:1. The large rotational movement advantage can b performed while still measuring the movement of the cameras to within 1 mm because the encoder 116 can be accurately moved to any of a number of measured positions for each turn of the drive shaft 206, such as 2,000 units per rotation of the drive shaft in readily available commercial servos or encoders. Any achievable degree of accuracy can readily be employed in the vehicle measuring system 10 to achieve a desired degree of accuracy in measurements. The camera 210 moves only back and forth along an arc of about 90°, that is about 45° to either side of a nominal equilibrium position. The camera 210 shown in FIG. 6 is upside down relative to the cameras in the measuring carriage 58, in order to show the associated hardware more clearly. The orientation in space of the any camera 210 does not affect the performance of the camera 210, encoder 116, pulley wheel 108 and other components related to the camera 210 itself. The orientation only is relevant in that the camera needs to be aimed, more or less, at the object of interest.

Figure 6:
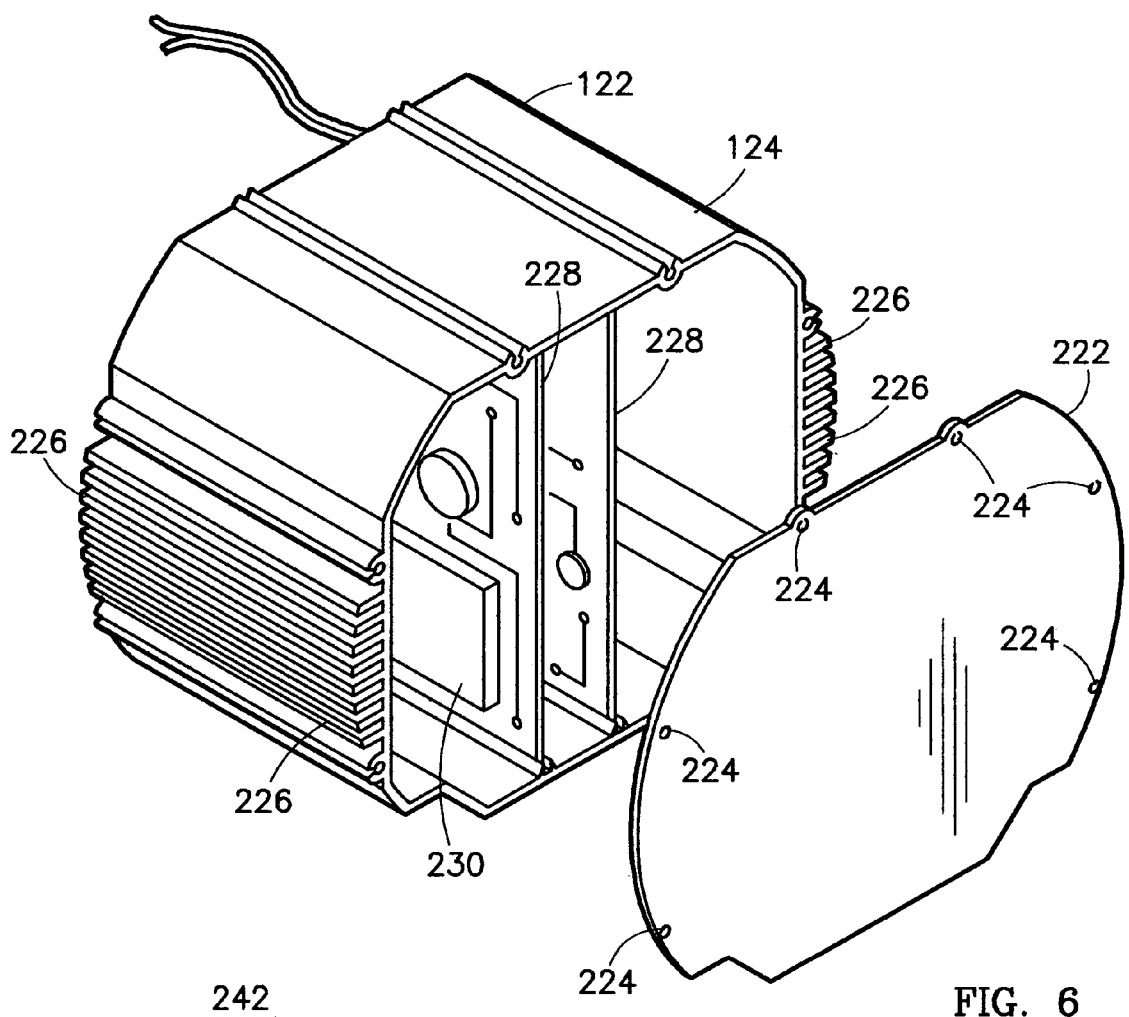
FIG. 6 is an isometric view of a control module housing and enclosed circuitry for use with the system for measuring points during damage repair on a vehicle according to FIG. 1.

Referring to FIG. 6, the control module 122 is seated inside the control module housing 124 has a removable cover 222 having a plurality of apertures 224 spaced about its perimeter for inserting screws to be received in screw sleeves in the control module housing 124. The control module housing includes a plurality of cooling fins 226 projecting outwardly from the outer surface to dissipate excess heat. Located inside the control module housing 124 is a number of circuit boards 228, which contain the electronic circuitry required to operate the vehicle measuring system 10, including the full duplex wireless transmitter and receiver 230, which may operate on infrared or any radio or microwave frequency that is desired and cooperates with the similar wireless transmitter and receiver 74 connected to the computer 72.

Figure 7:
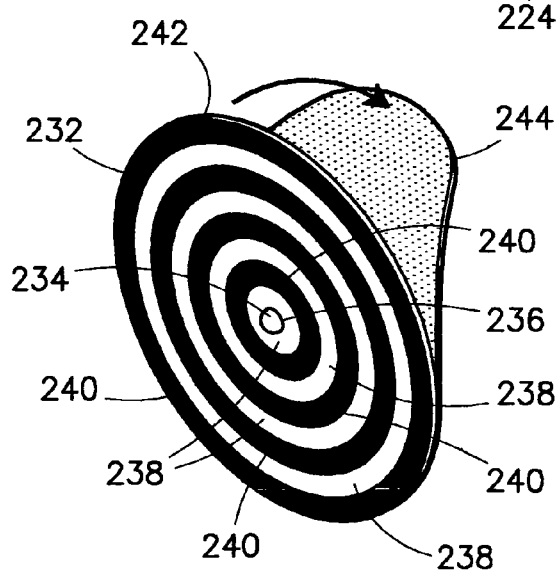
FIG. 7 is an isometric view of a target for use with the system for measuring points on a vehicle during damage repair of FIG. 1 showing the release paper being pulled away from the. adhesive backing on the target.

Referring to FIG. 7, a target 232, which may be made from paper, cardboard, or the like or may be printed directly onto a metal or wood plate or the like, includes a center bulls eye 234, which may be the light emitting diode 236 or a dark printed circle, which is surrounded by a plurality of concentric bands of alternating light colored and dark colored rings, with the light colored band 238 preferably being white and the dark colored bands 240 preferably being black, with sharp crisp edges between color changes. The exact number of rings is not important, but a target 232 having at least four light colored bands 238 and at least four dark colored bands 240 is preferred. The cameras will search for and locate the center of the target and then determine its place in space, as discussed below. The target 232 includes an adhesive layer 242 on its back, which is covered by the protective release sheet 244, which is manually peeled away, such as in the direction of the arrow 246 so that the target 232 can be adhesively applied to a target probe body (FIGS. 10-12 below).

Figure 8:
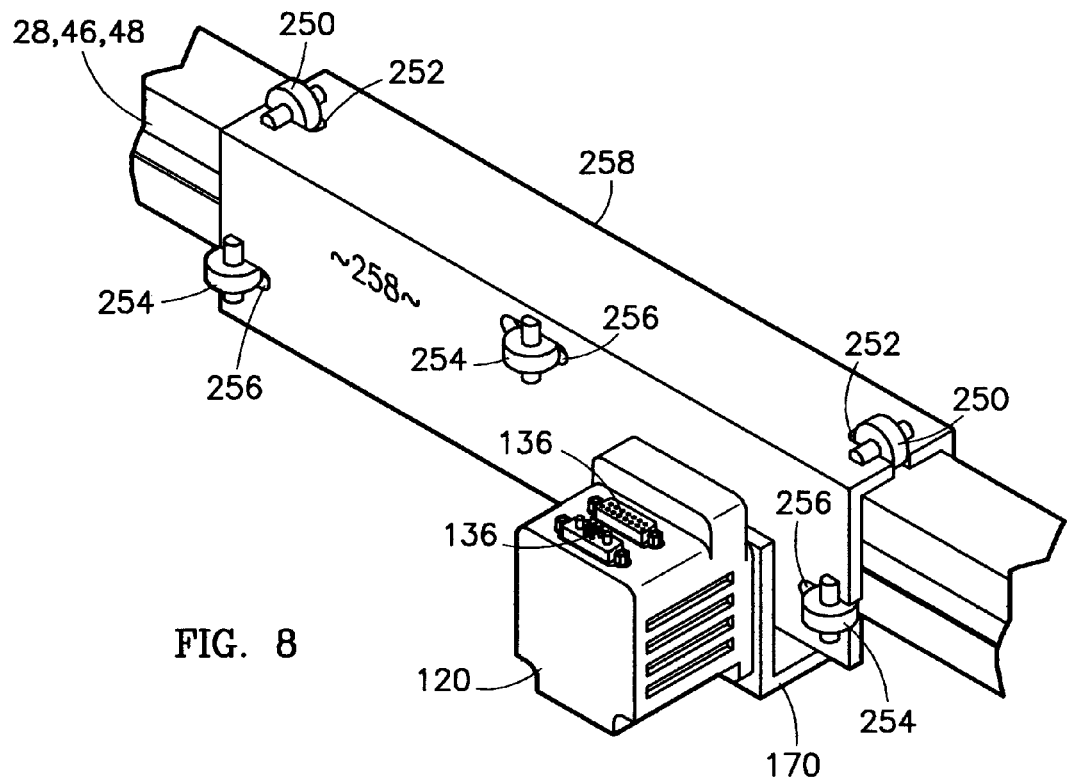
FIG. 8 is a isometric view of a portion of the drive mechanism of an underbody measuring carriage according to the system for measuring points on a vehicle during damage repair showing the idler wheels that permit it to roll along a pair of rails.

Referring to FIG. 8, the mechanism for moving the measuring carriage 58 and the front-end measuring unit 12 includes a U-shaped mounting member 248 having two idler wheels and axle assemblies 250 mounted in corresponding slots 252 in the mounting member 248, and three identical side wall idler wheels and axle assemblies 254 mounted in corresponding slots 256 on each of the vertical side walls 258 of the U-shaped mounting member 248. A U-shaped mounting member 248 is used with each of the members along which one or more cameras reciprocate, that is, a separate U-shaped mounting member 248 slides over the horizontal cross member 42 of the upright frame 28 and over the undercarriage driver's side rail 46 and the passenger's side rail 48 of the undercarriage measuring unite 26.

Figure 10:
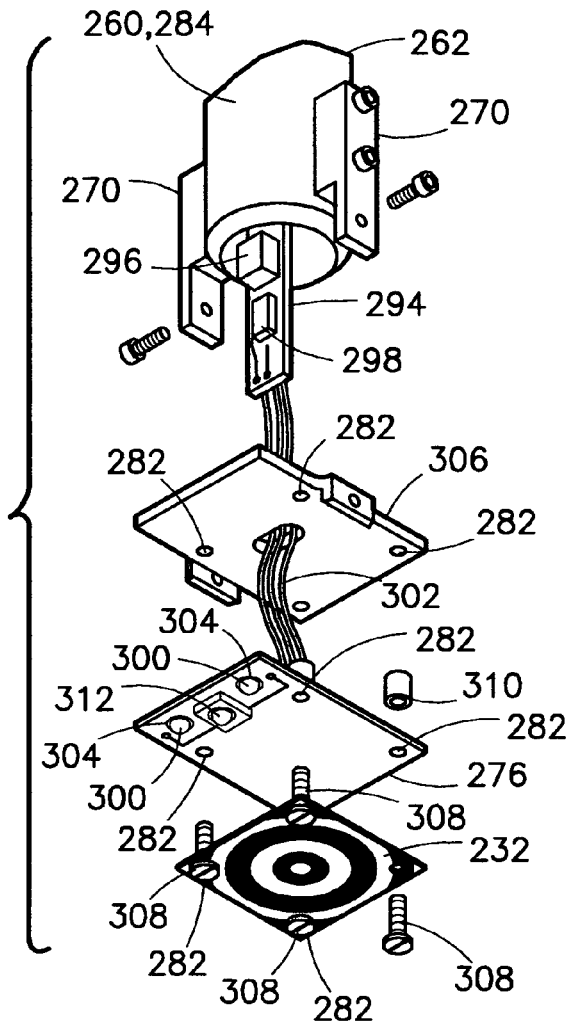
FIG. 10 is an exploded isometric view of the target body of FIG. 10 or 11 showing the electrical components an other hardware.

Referring to FIG. 10 a target probe body 260 includes a cylindrical body 262 that serves as a housing for electrical components (FIG. 10). An upper end 264 of the cylindrical body includes a threaded bore 266 that receives a threaded thumb screw 268 for tightening the target probe body against a vehicle undercarriage point to be referenced and which is inserted into the upper opening of the cylindrical body 262. A pair of opposed depending target legs 270 are attached to a lower portion 272 of the cylindrical body 262. Each target leg has a lower end 274 that is connected to a target plate 276 and that includes a central aperture 278 and which is preferably flat and square and made from metal. The target plate 276 can pivot about the axis defined by the two connection points 280 and its freedom of rotation is about 30° on either side of horizontal. The target 232 is adhesively fixed to the bottom of the target plate 276 or alternatively can be attached by utilizing the mounting apertures 282 on the target plate 276. Being able to tilt the target plate 276 toward a relevant pair of cameras eases the location of a particular target by the relevant cameras.

Figure 12:
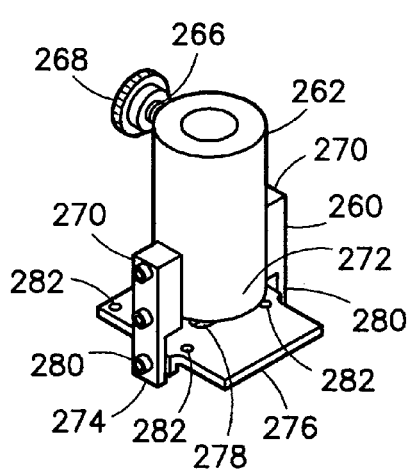
FIG. 12 is an isometric view of a target body for use according to the system for measuring points on a vehicle during damage repair of FIG. 1.
Figure 13:
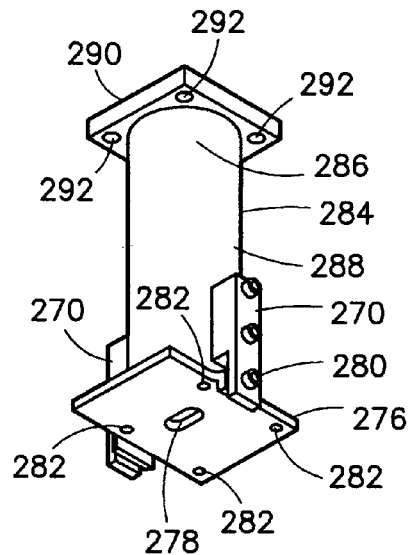
FIG. 13 is an isometric view of a second embodiment of a target probe body for use according to the system for measuring points on a vehicle during damage repair of FIG. 1.

Referring to FIG. 13, a longer target probe 284 is very similar to the target probe body 260 of FIG. 12 and is similarly numbered, except for the following discussion. An upper end 286 of the target probe body 288 has a mounting plate 290 fixed to it, which can be secured to a reference point on a vehicle undercarriage or other point of interest by screws inserted through the mounting apertures 292 or by clips fastened to the reference points and the edges of the mounting plate 290.

Referring to FIG. 10, each target probe 260, 284 contains a circuit board 294 that includes an electrical battery 296, an infrared transmitter 298, which transmits a signal that relates to the carriage control module 122, which includes an infrared receiving, the length of the target probe body, and associated circuitry all operatively and electrically connected. The target mounting plate 290 carries two light emitting diodes 300 electrically connected to the circuit board 294 by the electrical cables 302 and mounted in the apertures 302. The target mounting plate 290 is fastened to a spacer plate 306 along with the target by the nylon screws 308 through apertures 282 all three elements, with the space between the target mounting plate 290 and the spacer plate 306 being maintained by the interposed spacer bushing 310. The light emitting diodes are turned on and off by the switch 312. The light emitting diodes assist in the cameras' locating the targets 232 or other numbered targets by illuminating the targets moderately and by providing a light source that is registered clearly by the cameras.

Figure 14:
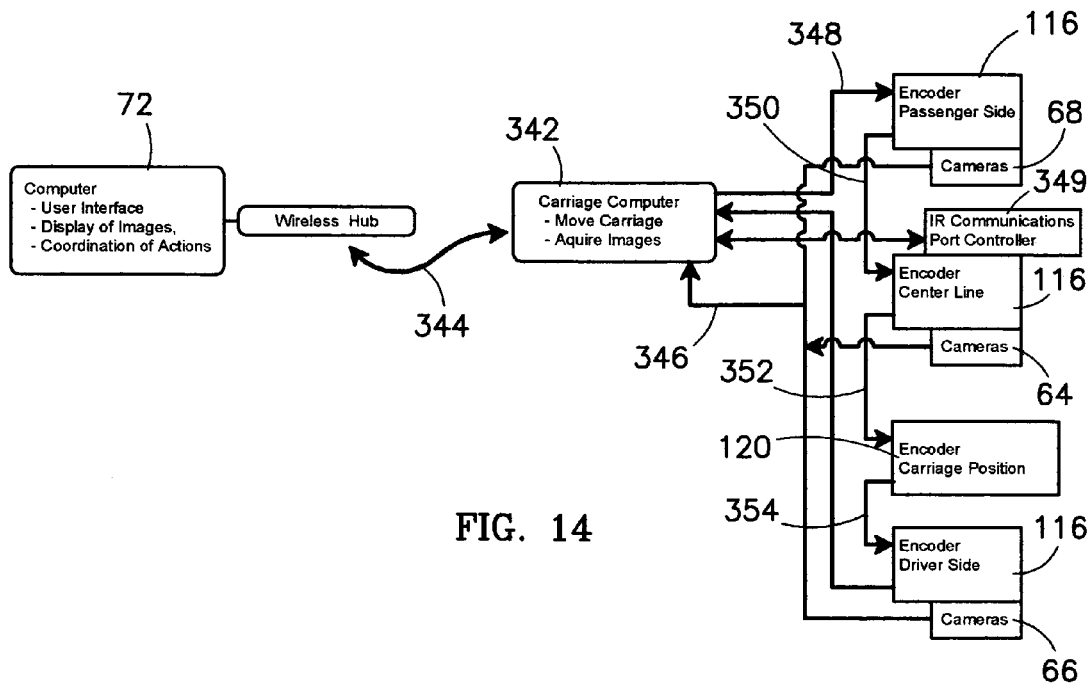
FIG. 14 is a flow chart of the computer software for carrying out the calculations of performed by the system for measuring points on a vehicle during damage repair of FIG. 1.

Referring to FIGS. 13, 14 the underside or bottom of the vehicle frame 314 includes a plurality of repair reference points 316 adjacent to the driver's side 318 and a plurality of repair reference points 320 adjacent to the passenger's side 322. A target probe 284 can be attached to any or all of these reference points 316, 320. The desired or designed location of each of these reference points 316, 320 is compiled for all motor vehicles by commercial companies that make this information available as digital databases which are used by most collision repair shops. The actual location of these reference points 316, 320 after damage is determined and measured by the measuring carriage 58 that travels underneath the vehicle 16.

Referring to FIG. 15, the front end 324 with the vehicle's hood removed reveals the cowling 326, the top of the driver's side strut tower 328 and related driver's side strut repair reference point 330, the top of the passenger's side strut tower 332 and related passenger's side repair reference point 334, as well as the braces 236. Also shown are the driver's side cowling repair reference point 238 and the passenger's side cowling repair reference point 240. A target probe 284 can be attached to any of these four reference points and their actual locations can be measured by the front end-measuring unit 12 on the upright frame 28.

Referring to FIG. 14, the computer 72 includes is connected to the wireless transmitter and receiver 74 for full duplex communication with the carriage computer 342, housed in the control module housing 124 and forms part of the control module 122. The carriage computer 342 controls the rotational angle of the encodes 116 and associated cameras 68, 64, 66 or lasers 211 and tracks their angular positions by counting the increments of rotation of the encoders 116, all through the data bus 348. The carriage computer 342 also controls operation of the encoder drive motor 120 that drives the measuring carriage 58 back and forth along the ladder track assembly 56 by counting the revolutions of the drive shaft of the encoder drive motor 120. The size of the encoder drive gear 174 and the rack gears or teeth 176 and a measurement with tolerances of 1 mm or less are easily achievable. An infrared communications port controller is also operatively connected to the carriage computer 342. Each of the cameras 68, 64, 66 creates a picture that is converted in the camera to an electrical signal related to the picture and which may be analog or digital and transmits the picture information to the carriage computer along a separate portion of the data bus 346 and each of these picture transmission cables only sends signals to the carriage computer and does not receive any signals, as indicated by the arrowheads leading away from the cameras 68, 64, 66.

The passenger's side 24 encoder 116 is connected to the centerline encoder 116 (connected to the centerline camera 64) by the bus 350, while the encoder 116 on the centerline of ladder track assembly 58 is also connected to the carriage position or drive motor encoder 120 by a separate bus 352. Finally, the drive motor encoder 120 is connected to the driver side 20 encoder 116 by the separate bus 354.

In operation, the vehicle 16 is placed over the undercarriage ladder track assembly 56, with the longitudinal centerline of the vehicle approximately directly above and parallel to the longitudinal centerline of the of the ladder track assembly 56 and is preferably clamped into place to prevent any significant movement of the vehicle 16 in relation to the vehicle measuring apparatus 10. The locations in space of the moveable parts of the vehicle measuring system 10 and of the targets 232 attached to vehicle 16 frame 314 are measured along the xyz coordinate system, with the directions of each of these axes shown by the graphic 360 in FIGS. 1, 2. The origin of the xyz coordinate system is approximately at the centerline camera 64 when the measuring carriage is against the forward stops 59, with one stop 59 on each rail 46, 48 as shown in FIGS. 1, 2. A pair of rear stops 61, one each on the back ends of the rails 46, 48, prevents the measuring carriage from running off the back of the rails 46, 48, as shown in FIGS. 1, 2. The stops 59, 61 may be made of rubber and serve as bumpers.

Alternatively and better in practice, the vehicle measuring system 10 locates and measures the distances between four known points inside the edges of the crumple zones of a vehicle and attempts to locate the center of the shape defined by these four points. These four points are generally close to their proper positions if damage is repairable. The vehicle measuring system 10 can work if three of the four points can be located and a center point determined from these data. Otherwise, the vehicle 16 is probably a total loss in any event. Ultimately, the origin used to plot points depends on the origin selected by the suppliers of data on the data points of vehicle chassis, but an origin deep inside the chassis and removed from external crumple zones seems to work best because it provides the origin for measurements that is less likely to have be deformed from any collision or other damage. Further, pinch well clamps are used to clamp the vehicle 16 body firmly in place for repairs, so the origin should not change during repair, even chain pulling, and the vehicle measuring system 10 does not need to be removed from under or above the vehicle 16 even during pulling and the origin should not move. Therefore, normally, it is no necessary to re-calibrate or adjust the position of the vehicle measuring system 10 after pulling on the vehicle 16 chassis. It is only necessary to repeat the measuring routine first undertaken to determine whether the measured points are in their proper positions and, through iteration to continue until they are.

Referring to FIGS. 16, 17, each reference point 316 is located utilizing the driver's side camera 66 and the centerline camera 64 as indicated by the camera lines of sight 363, 364 (FIG. 1) because these are closer to the reference points toward the driver's side of the vehicle 16 and triangulation is more accurate that it would be if the angles of the rays from the cameras were shallower.

Similarly, reference points 314 toward the passenger's side 24 of the vehicle 16 are located by triangulation from the centerline camera 64 and the passenger's side camera 68.

Reference points under the hood of the vehicle 16 as shown in FIG. 15 are located by the two elevated cameras and encoder assemblies 378, 380 on the horizontal cross member 40, with the lines of sight represented by the rays 368, 366 (FIG. 1) respectively when the cameras have centered in on a target 232.

Figure 18:
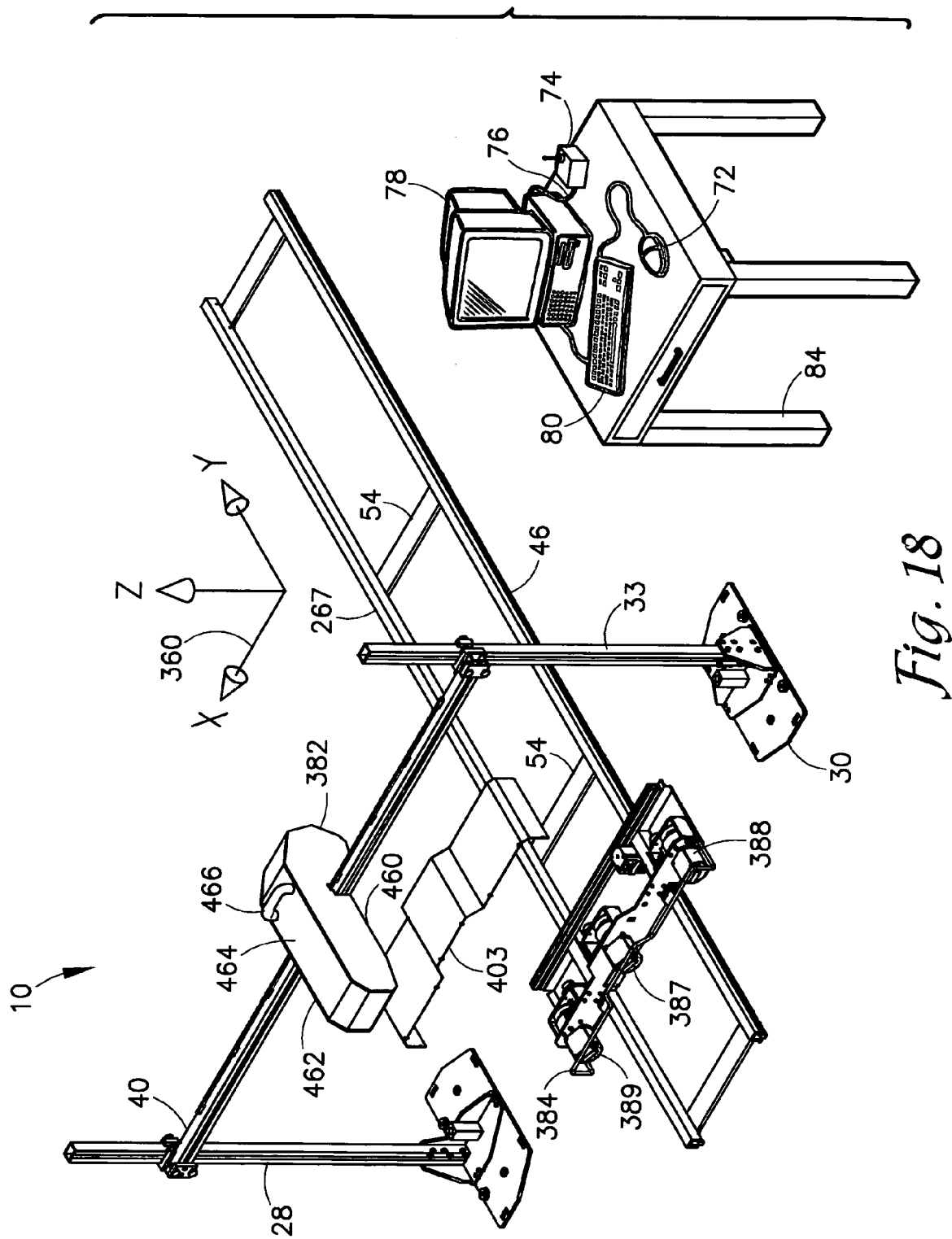
FIG. 18 is an isometric view of a system for measuring points on a vehicle during damage repair of FIG. 1 illustrating an alternative embodiment.

Referring to FIG. 18, an alternative embodiment of the vehicle measuring system 10 includes an alternative embodiment of the upper carriage 384 and an alternative embodiment of the lower carriage 384, each extensively utilizing optically isolated circuits to minimize cross talk and other interference and wireless full duplex wireless transponders are utilized extensively to reduce the wiring required between components. Each wireless transponder tuned to a separate frequency to eliminate cross talk from subsystems on the vehicle measuring system 10 and from other sources that may be present in the shop.

Figure 19:
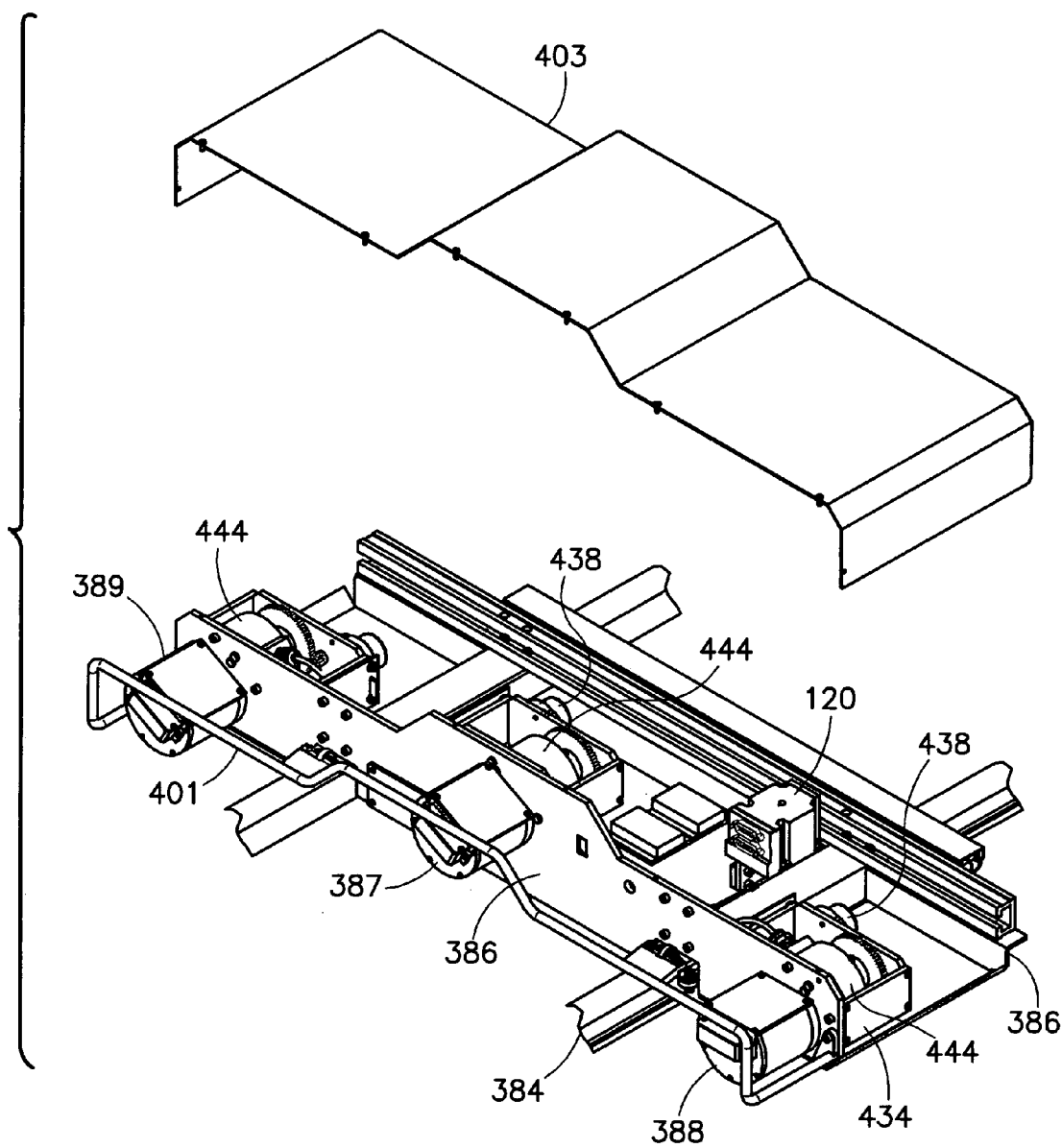
FIG. 19 is an isometric view of an alternative embodiment of the lower instrument, undercarriage measuring unit of FIG. 3, shown with the housing, or cowling, exploded from the assembly.

Referring to FIG. 19, the lower carriage 384 includes a chassis 386 carrying three camera housing assemblies, which are identical, as described below including a center camera assembly 387, a driver's side camera assembly 388 and a passenger's side camera assembly 389 and an appropriate wiring harness 401. An appropriate cowling 403 covers and protects the lower carriage assembly 384 from debris.

Figure 20:
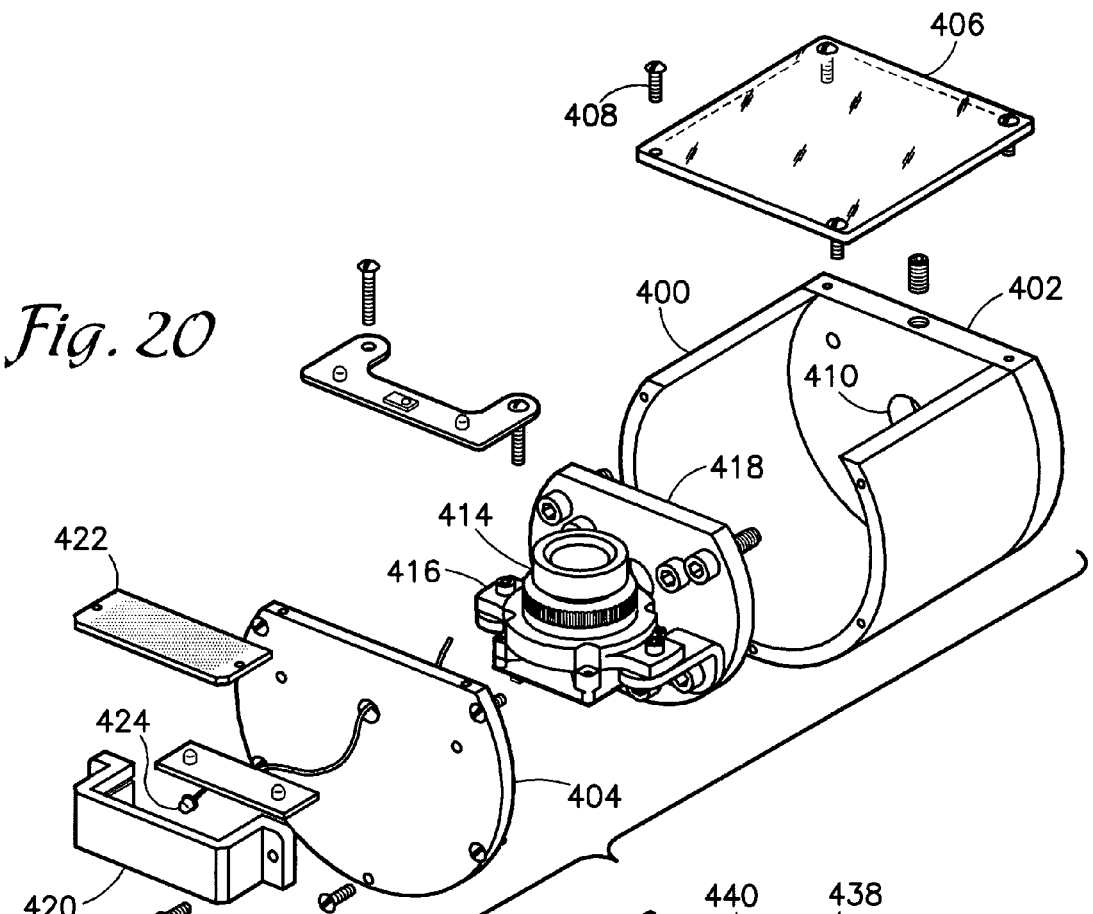
FIG. 20 is an exploded isometric view of an alternative embodiment of the camera housing for use with the system for measuring points on a vehicle of FIG. 18.
Figure 21:
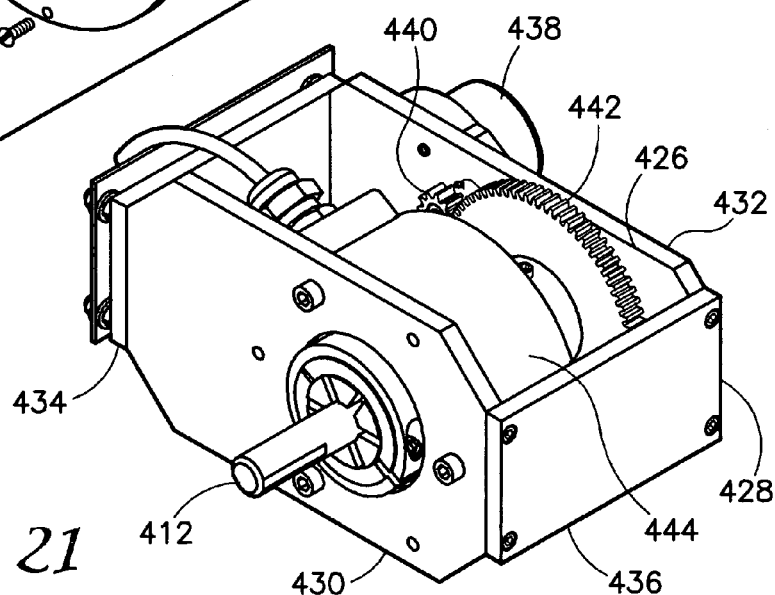
FIG. 21 is an isometric view of the drive mechanism for rotating the camera located in the camera housing of FIG. 20.

Referring to FIG. 20, an alternative embodiment of the camera housing assembly discussed above includes a substantially cylindrical camera housing 400 with a rear wall plate 402 secured thereto, a front wall plate 404 secured to the front of the housing 400, with the top edges of the housing 400 defining a plane and covered by a top plate 406 which is flat and transparent, intended to protect the camera, while allowing electromagnetic radiation, to penetrate it and is secured to the housing 400 by the screws 408. An aperture 410 admits the drive shaft 412 (FIG. 21). The camera 414 preferably has a focal length of about 15-50 mm, with the preferred focal length being about 30 mm. The camera 414 is preferably a digital camera having a CCD pixel size of about 7 μm square. The camera 414 is mounted on the bracket 416, which is fastened to the camera plate 418, with the drive shaft 412 connected to the camera plate 418 for pivotal rotation of the camera plate 418 and, consequently, the camera 414. A U-shaped bracket 420 fastened to the front of the front wall plate 404 is covered with a protective translucent top plate 422 to defuse light from an LED 424, or the like, which is turned on to illuminate targets under the car in the dark, if needed, and can be a source of infrared, visible light or other electromagnetic radiation.

Referring to FIG. 21, there is shown one of the three camera assemblies utilized by the vehicle measuring system 10, each of which is identical. It has, however, been found desirable that the middle camera be raised up somewhat relative to either the driver's side camera or the passenger's side camera, which both lie in the same horizontal plane, in order that two cameras can view distant points on the vehicle, which requires mathematical translation of the data to account for the camera's being in slightly different planes. The camera drive assembly 426 includes a frame 428 having a front side wall 430, a rear side wall 432, a left-hand side wall 434 and a right-hand side wall 436, each being a metal plate and connected together by screws to form the frame 428. A stepper motor 438, having a 2000 counts/revolution, is mounted on the outside surface of the rear side wall 432 of the frame 428, with a drive shaft connected to a small gear 440 penetrating the rear side wall 432 so that small gear 440 lies on the inside of the frame 428, where it meshes with a large drive gear 442, which drives the 4,000 count/revolution encoder 444 that precisely determines, measures and reports to the software systems the amount of rotation of the cameras and hence their positions at any time. The stepper motor 438 provides the motive force to rotate the cameras, such as the camera 414. The gears have little backlash, to improve the accuracy of positions measured through rotation of the gears and provide more precise positioning of the cameras than the belt 218 drive system shown in FIG. 5.

Referring to FIG. 22, the lower carriage 384 (as well as the lower carriage shown in, e.g., FIG. 3) rides along the parallel ladder rails 46, 48 (e.g., FIG. 1) on the track sleeve member 443, having a top side portion 446, a left-hand side portion 448 and a right-hand side portion 450, all formed preferably from a one-piece extrusion, with a top roller bearing 452 adjacent to each end of the top portion 446, and roller bearing 452 mounted adjacent to each end of each of the left-hand side portion 448 and the right-hand side portion 450. Each roller bearing 452 is mounted so that the outside edge of the bearing race bears against the corresponding wall of the rail 46, suspending the lower carriage 383 without direct contact with the rail 46, reducing the friction involved in moving the lower carriage 384. A separate debris scraper 454 is mounted on each end of the top portion 446 consists of a plate having a sharp outward edge 456 and is pivotally mounted on the top of the top portion 446 with the outward edge 456 free to fall down into contact with the top surface of the top portion 446, thereby scraping debris off of the top portion 446 as the lower carriage 384 travels along the undercarriage ladder rails 46, 48.

Referring to FIG. 23, the upper carriage measuring unit 382 includes a driver's side frame member 460 and a corresponding passenger's side frame member 462 and a top side member 464 connected to the two side frame members 460, 462 with a carrying handle 466 connected to the top side member 464 (FIG. 18). An onboard rechargeable battery 468 supplies electrical power to operate the upper carriage measuring unit 382, which may be operated by other electrical power source and is electrically connected to all electrically operated parts of the upper carriage measuring unit 382.

Still referring to FIG. 23, a frame 470 includes an outer perimeter wit an internal upper stiffening rib 472 and a connected lower stiffening rib 474 forming a reinforcing web for securing the internal components. A rear camera bucket 476 holds a rear camera 478 which is connected to the rear camera drive gear 482, which is actuated by the rear camera stepper motor 480 through the connected small gear 485 for controllably pivoting the rear camera 478 about the rear camera axis 483. A front camera bucket 484 hold the front camera 486, which is pivoted about the font camera axis 487 by the attached front camera drive gear 488, which is controllably driven by the front camera stepper motor 490 through the small drive gear 491. A set of five rail roller bearings 494 hug the upper carriage rail 40 and the upper carriage is locked onto the upper carriage rail 40 by the rail clamp handle 496. A servo motor 498 propels the upper carriage 382 back and forth along the upper carriage rail 40, with the exact position of the upper carriage 383 along the upper carriage rail 40 being controlled and measured by the rotational movements of the drive shaft of the servo motor 498. The electronic circuitry 500 that controls the front and rear cameras 478, 486, and the servo motor 498 is mounted on the circuit board assembly 502, which pivot upwardly about the circuit assembly hinge 504, allowing them to be pivoted upwardly from the frame 470 for easy servicing. In the downward, i.e., installed position, the circuit board assembly 502 rests against the stop member 506

Figure 24:
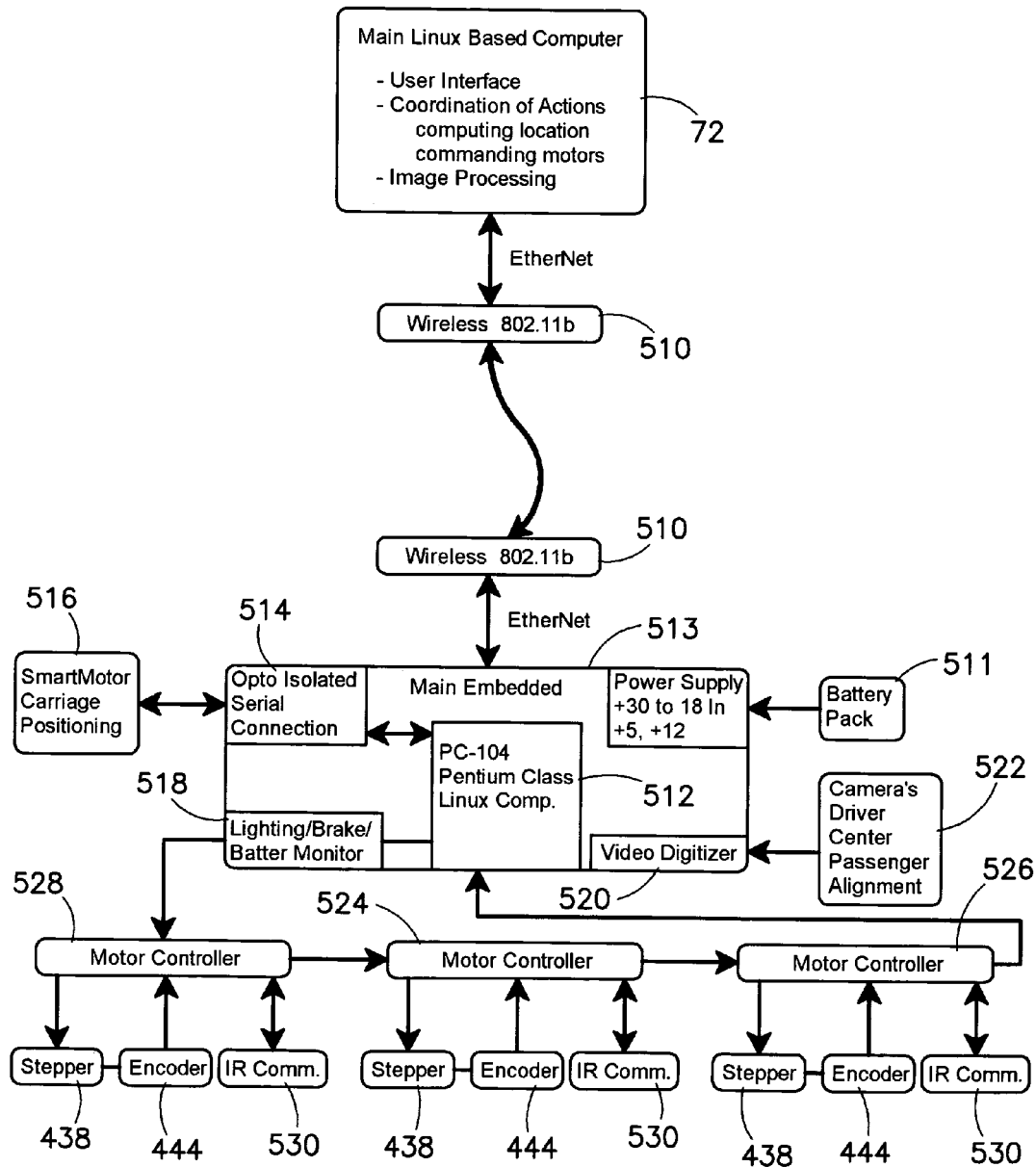
FIG. 24 is a flow chart of the interaction between the mechanical components and the computer components of the apparatus of FIG. 1.

Referring to FIG. 24, the basic schematic layout of the electronic, electrical and computer components for the lower carriage includes the personal computer 72 utilizing any suitable operating system, which communicates with the lower carriage and upper carriages' 382, 384 hardware and software through the two conventional wireless transponders 510 operating under standards 802.11(b) as shown, 802.11(g) via a network protocol or other wireless standard, which sends signals to and receives signals from the carriages 382, 384, which include the embedded controller 513. An onboard electrical battery 511 provides power to all functions on the lower carriage 384 and will supply power for up to about three or four hours of operation. The battery 511 can be recharged. A discharged battery can be quickly replaced with a freshly charged battery. Alternatively, an electrical cord can be run to unit, but tends to become tangled and is not as desirable as batter power. A personal computer on a chip 512 communicates directly to the computer 72 through the optical isolation serial connection 514. The stepper motor for carriage positioning 516 also sends and receives signals through the isolator 514, with the input to the stepper motor 516 instructing the stepper motor 516 how many revolutions to make, and therefore where to position itself along the ladder track assembly 56 and when to stop and when to start, and signals from the stepper motor 516 provide the location of the lower carriage along the ladder track assembly 56 precisely, e.g., within one millimeter of the actual location. A brake helps slow and stop the lower carriage, which moves very freely along the ladder track assembly 56, and the brake, a battery monitor and under vehicle lighting to illuminate or identify targets are all controlled through the lighting/braking/battery monitor software module 518. A video digitizer module 520 digitizes the video input from the driver's camera/center camera/passenger's camera alignment module 522.

Still referring to FIG. 24, the center motor controller 524 controls the center camera 387; the passenger's side motor controller 526 controls the passenger side camera 388 and the driver's side motor controller 528 controls the driver's side camera 389. The controlling software and hardware for each of the cameras is the same and so will be described here only once. Each controller 524, 526, 528 is connected to and coordinates a separate stepper motor and connected encoder, numbered to correspond to FIG. 21, and an infrared communications module 530, which utilizes flashing light emitting diodes (LED) to signal to a target in an eight bit computer code that provides a unique identifying code, such as the place, and date of manufacture and the manufacturer and other data that can be programmed into the electronic chip that actuates the LED, allowing each LED to identify itself to receive signals from, for example, a target thereby insuring that the proper identification of a target has been made.

FIG. 24 also applies in full to the upper carriage 35, 382, but with only two cameras. The lower carriage has three cameras because a center camera is required to coordinate with an outboard camera on the passenger's side or the driver's side in order to view targets on either side of the longitudinal centerline of the vehicle. It is possible that two cameras could be used on the undercarriage measuring unit, if the vehicle is narrow or the cameras are placed in optimal positions, but in general three cameras are required to adequately locate any point on the chassis of a vehicle. With the upper carriage, the points being measured all have a clear line of sight from the two cameras to the points to be measured, so only two cameras are needed.

Figure 27:
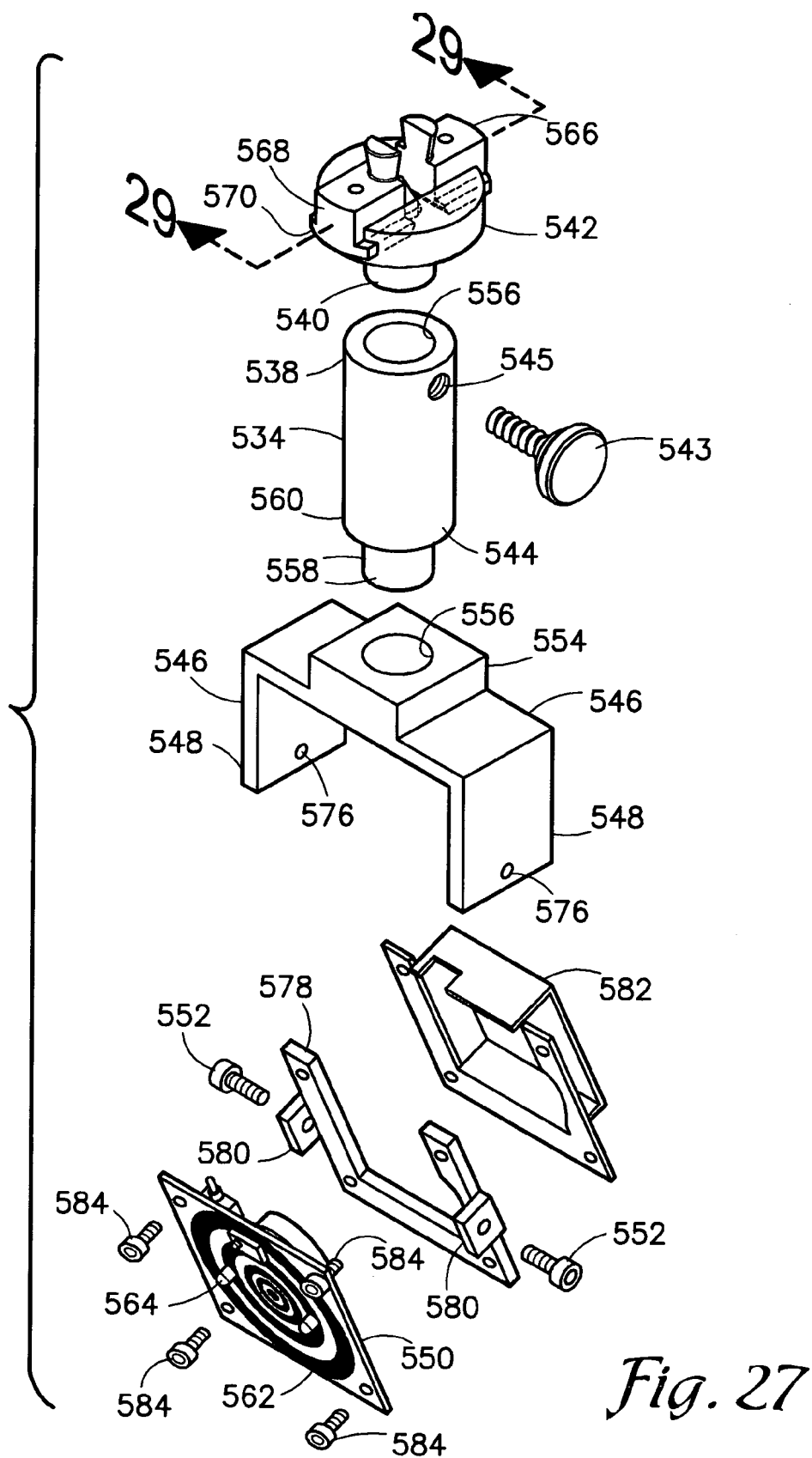
FIG. 27 is an exploded isometric view of the target locating assembly of FIG. 25.

Referring to FIGS. 25-27 a target assembly 532 includes a target stem 534 having a bore 536 in its top end 538, which receives a depending stem portion 540 of a chassis clamping member 542. The target stem 534 can be freely rotated about the depending stem portion 540 to a desired angle of rotation and then locked into that selected position by the thumb set screw 543, which is received in the threaded bore 545. Mounted on the lower end 544 of the target stem 534 is the target frame 546, which is essentially a U-shaped bracket having parallel depending side walls 548, with the target assembly board 550 pivotally connected between the depending side walls 548 by the adjustable machine screws 552. The target frame 546 includes an upstanding boss portion 554 having a bore 556 through its center for receiving a dowel end 558 on the lower end 560 of the target extension stem 544, which provides sufficient frictional engagement to keep the two members together while allowing them to be readily separated. The target extension stem can be readily removed, as is evident in FIG. 27, and is inserted principally when a point to be measured is recessed above the general bottom plane of the vehicle chassis 561. Adding a target extension stem 534 of appropriate length allows the target to be in a direct line of sight to the cameras. When a target extension stem 534 is not used, as shown in FIG. 28, the depending stem portion of the chassis clamping member 542 is inserted directly into the bore 556.

Still referring to FIGS. 25-27, formed on the front surface of the target assembly board 550 is a target 562 having a series of concentric rings of alternating light and dark bands. Also mounted on the front surface of the target assembly board 550 and projecting outwardly therefrom is an LED 564 for signaling to the cameras that a target has been located and for specifically and uniquely identifying each target (about six to eight targets are typically used on a vehicle and they may all be placed on the chassis and measured at once in one pass). The target assembly board 550 includes its own microprocessor, battery, switch and other electronic circuitry as described below.

Still referring to FIGS. 25-27, at the top of the chassis clamping member 542 is a pair of opposed aligned jaws 566, 568 set into a channel 570 with each jaw 556, 558 having an upstanding flange portion 572, which together form an inverted truncated cone split down the middle from top to bottom, with the jaws 556, 558 being pushed apart to clamp themselves against a machining hole 564 in the lower portion of a vehicle chassis 566, simultaneously clamping the target assembly - - - into the machining hole 574 and centering the axis of the target assembly 532 in the machining hole 574. Most points that are conventionally used to measure points on a vehicle, for example, are in machining holes in the chassis that were formed by the manufacturer during manufacture and are conveniently available. The expanded clamping action of the jaws 556, 558 is shown in FIG. 26, in which the target assembly has been installed for measuring by the vehicle measuring system 10. Then the actual target assembly board 550 can be pivoted about the adjustable machine screws 552, which are received in the corresponding threaded apertures 576 (FIG. 27) and the target extension stem 534 can be rotated to present the target to the cameras along a desirable line of sight with the face of the target 562 more or less perpendicular to the cameras is best.

Referring to FIG. 27, the target assembly further includes a target mounting U-shaped bracket frame 578 having a pair of forward projecting ears 580 with corresponding apertures for receiving the screws 552 and a box-shaped target assembly housing 582 for receiving and protecting the electronic circuitry on the rear surface of the target assembly board 550. The target assembly board 550, the target mount U-shaped bracket frame 578 and the target assembly housing 582 are fastened together by the four screws 584.

Referring to FIG. 28, in some cases, it is desirable to use a reference point on the vehicle chassis 561 that does not have a machining hole 574. In this case, a target mounting base 586 having six magnets 588 press fitted into corresponding vertical bores equally spaced about the circular top surface 590 of the target mounting base 586 adjacent to its perimeter. The magnets 588 shown are rods, but may be any convenient shape and firmly anchor the target assembly 532 to any ferrous surface.

Referring to FIG. 29, the chassis clamping member 542 includes an adjustment screw 592 threadably received in the vertical bore 594 and having a driving slot 596 in its lower end, and a conical penetrating end 598. When the adjustment screw 592 is advanced in the bore 594, the conical penetrating end 598 pushes against the jaws 566, 568, forcing them apart and firmly clamping the corresponding upstanding flange portions 572 of the jaws 566, 568 against the edges of a chassis hole 574. The inverted cone shape of the flange portions allow them to grip in holes 574 of different sizes. Withdrawing the adjustment screw 592 partway down the bore 594 releases the jaws 566, 568 from the hole 574, allowing the chassis clamping member 542 to be withdrawn from the hole 574, with the directions of travel of the jaws 566, 568 shown by the double headed arrows 600. In use, which a chassis machining hole 574 is a reference point, the chassis clamping member 542 is inserted into the hole 574 and tightened. Then the fully assembled target frame 546 is installed over the depending stem portion 540 of the chassis clamping member 542. An extension stem 534 is interposed if needed.

Figure 30:
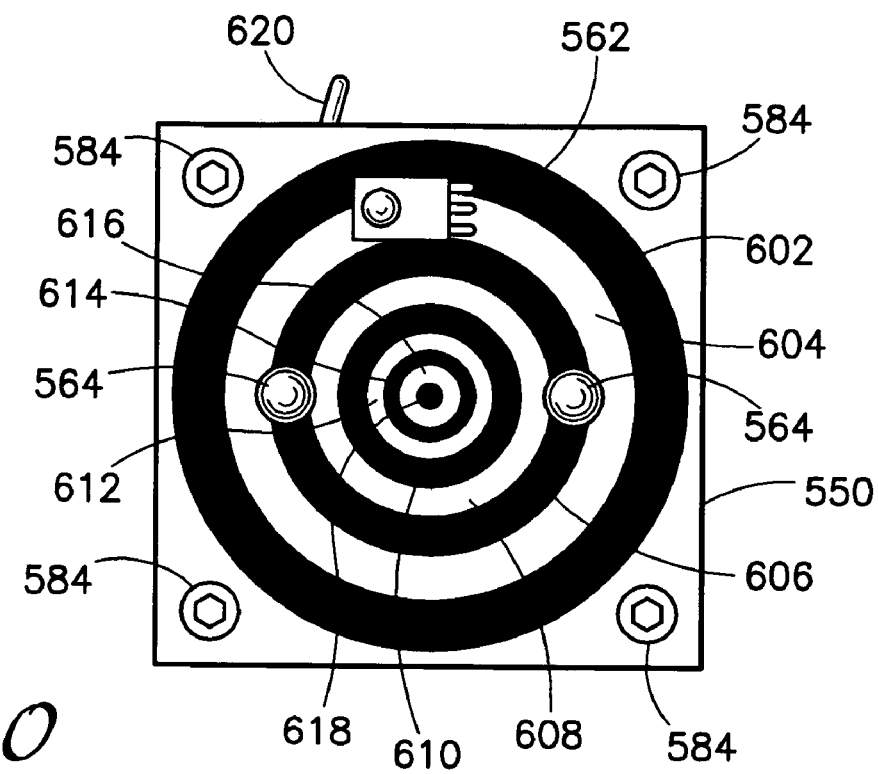
FIG. 30 is front view of the target of the target locating assembly of FIG. 25.

Referring to FIG. 30, the target 562 includes a dark outer band 602, and progressively smaller diameter and thinner concentric bands of alternating light and dark bands, including from the outside of the target 562 toward the center, the light band 604, the dark band 606, the light band 608, the dark band 610, the light band 612, the dark band 614, the light band 616 and the bull's eye 618, which is a solid black circle. Edge seeking software according to well known techniques, drives two selected cameras to search for opposing edges, progressively driving them toward the bull's eye 618, where no edge can be detected and so the cameras stop searching and determine that they have centered the bull's eye 618 in the center of their field of view. The two LEDs 564 are positioned across a diameter from one another and are essentially located in the dark band 606. As described above, these LEDs 564 signal a unique identifying signal in the form of an eight bit computer code to the cameras to serve as beacon, if needed. They are not always needed. The circuitry associated with LEDs 564 is actuated on an off by the toggle switch 620 and is turned on by a signal from the carriage measuring unit 26, 384 that is generated and sent if a particular target cannot be detected, which sometimes occurs in very low light conditions. It has been found that a target 550 having concentric bands of progressively thinner widths provides much more certain and speedy location of a bull's eye that a target having concentric bands of the same width.

Figure 31:
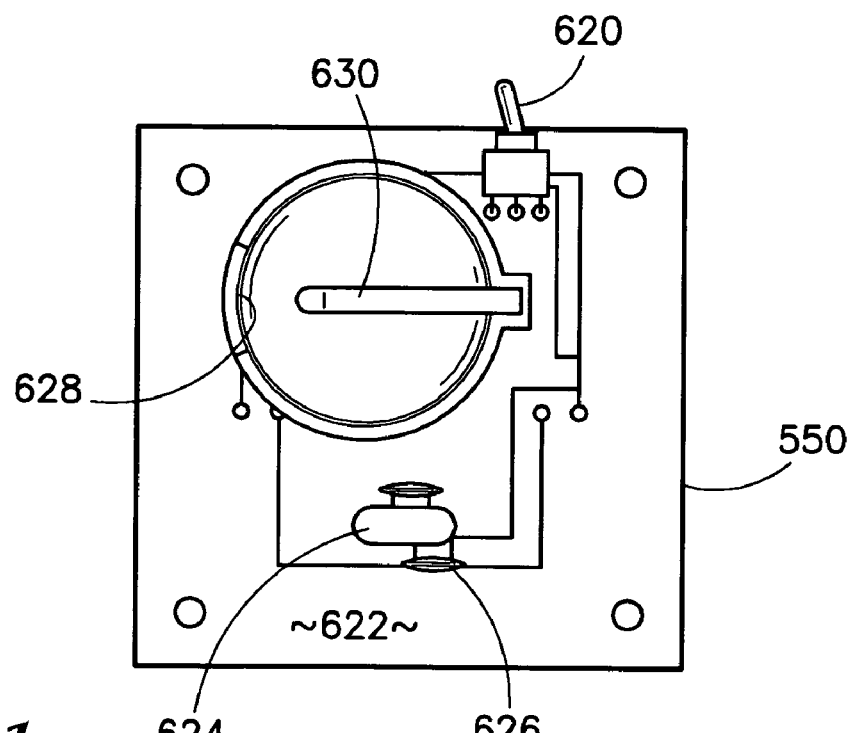
FIG. 31 is a top view of a circuit board used in the target locating assembly of FIG. 25.

Referring to FIG. 31, the rear surface 622 of the target board 550 carries the electronic circuitry needed to communicate wirelessly with the computer system, including a wireless transponder 624 and antenna 626, which are powered by the replaceable battery 628, which is held in place by the spring loaded rear battery contact member 630.

Figure 32:
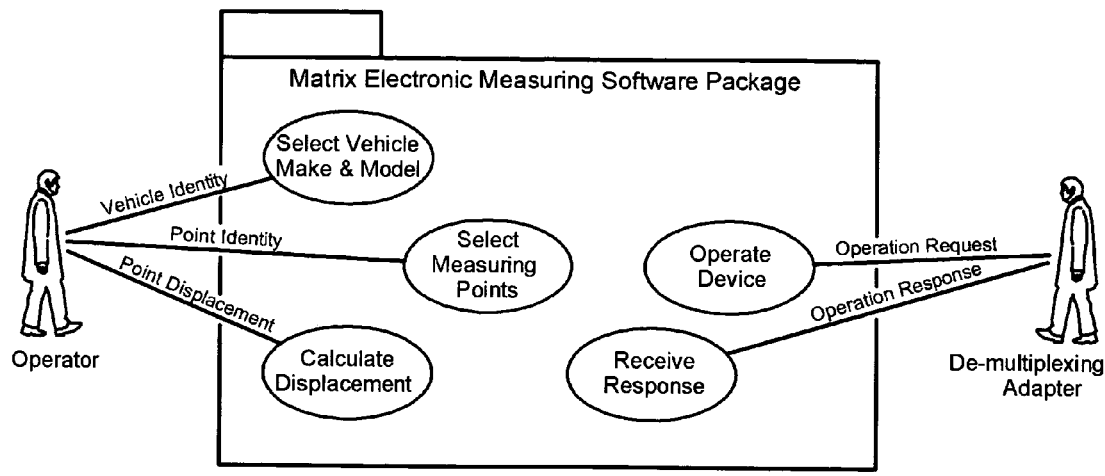
FIG. 32 is a use case model of the software on both the personal computer and on the lower and upper measuring carriages used by the vehicle measuring system of FIG. 1.
Figure 33:
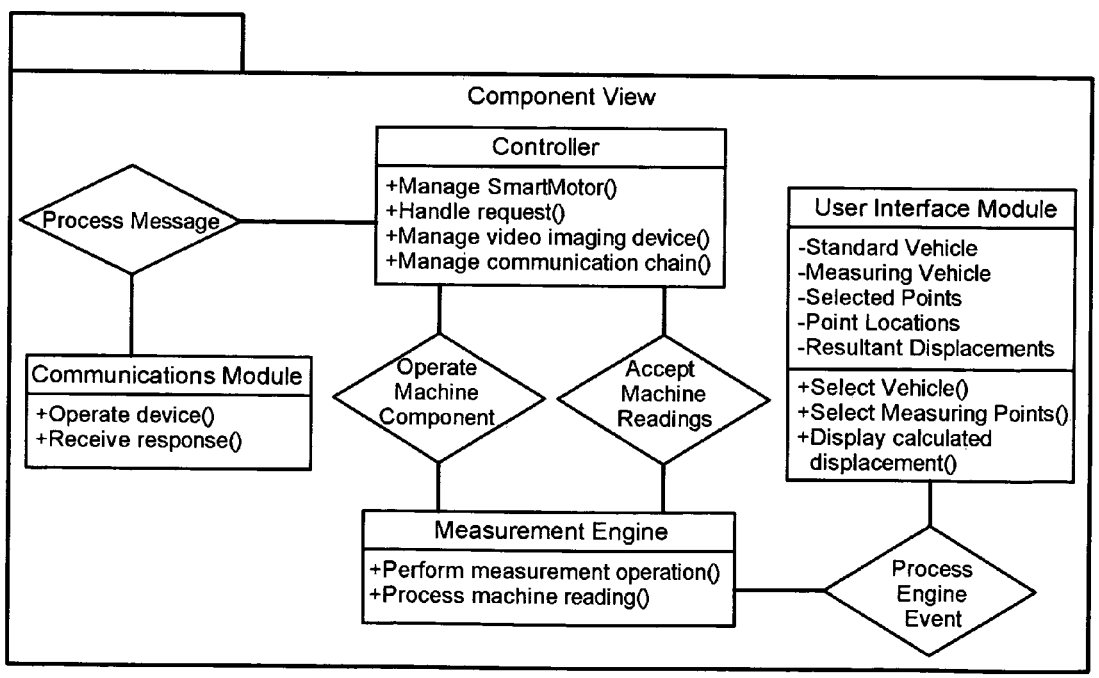
FIG. 33 is a class diagram of the software on both the personal computer and on the lower and upper measuring carriages used by the vehicle measuring system of FIG. 1.

FIGS. 32, 33 are diagrams of computer components presented in universal modeling language (UML) and are believed to be largely self-explanatory. In FIGS. 32, 33, diamond boxes represent a message that is generated and sent somewhere. Rectangular boxes represent system components. Oval boxes represent individual independent interactions. The stick figures represent the people or devices outside the computer and software system.

Referring to FIG. 32, this use case diagram shown how the software interacts with people and devices outside the system of the vehicle measuring system 10. For this purpose, the personal computer, undercarriage measuring unit and the under the hood measuring unit are all considered "the system." People, the vehicle and so forth are outside the system.

Referring to FIG. 33, this class diagram illustrates how the components of the system interact inside the system. In this class diagram, word entries that begin with a hyphen, e.g., -Standard Vehicle, represent data entities used by the component they are shown in. The lines beginning with a plus sign, e.g., +Select Vehicle, represent operations of the component.

The electronic measuring system software package that operates the vehicle measuring system 10 for include four interacting systems, each of which has subsystems, using both synchronous and asynchronous event delivery. As used here, synchronous event delivery means that the requesting module waits for a response before proceeding with further work and asynchronous event delivery means that the requesting module does not wait for a response prior to proceeding with further work. Each autologous system is discussed separately below.

The daisy chained serial (DCS) communications module chain delivers messages over the buffered DCS communications module link in an asynchronous delivery. In almost all cases, however, a response event is generated and is sent back over a serial link. Types of messages include requests for infrared devices such as the infrared communications modules 530, motor controllers, i.e., stepper motors, such as 438, encoders such as 444, etc., relays and voltage readings.

The embedded controller 513 manages five subsystems, which are the DCS communications module chain, a video imaging device, a stepper motor, extended markup language-remote procedure call (XMLRPC) request and response systems. Any particular response may be made synchronously or asynchronously. Imaging, for example, is made asynchronously because it utilizes substantial system resources. The XMLRPC system delivers an images request to a dedicated imaging thread. All XMLPRC requests for devices on the DCS communications module chain are made synchronously, since delivery to the PIC microcontrollers is a relatively quick and reliable asynchronous path. PIC microcontrollers are reduced instruction set computers (RISC) and PIC stands for peripheral interface controller. The same follows for the stepper motor.

Upon receiving events from the DSCS, the stepper motor or imaging threads, a signal for these events must be delivered to any subscribed receivers, which is accomplished by an XMLRPC client system. Since the outgoing hypertext transfer protocol (HTTP) requests can block, all events sent to the XMLRPC system are asynchronous, delivered to a dedicated XMLRPC dispatcher thread. This thread is responsible for delivering the messages to any interested listeners.

For convenience, "engine" (See FIG. 33) is defined as proxy objects that reflect the state of real objects on the vehicle measuring system 10, such as electric motors, camera, relays and so forth, and threads that manage the sequence of events to conduct meaningful actions such as measuring or calibrating procedures.

The sequencing of thread can be thought of as actors, introducing events into the vehicle measuring system 10. They command motors and camera into movement and acquisition of data by delivering requests to the proxy objects.

The proxy objects support their command interface by delivering requests to the embedded controller 513. They are also subscribers to the embedded controller 513, receiving events containing state information.

The user interface is presented to the personal computer 72 monitor 78 for use by the operator, i.e., system user and subscribes to any embedded engine events and reflects them as dynamically as possible. Any actions by the user, such as mouse clicks, pushing buttons, and so forth, are simply tied to calls on embedded engine capabilities and data. The primary purpose of the user interface is convince that the vehicle measuring system 10 is actually working and performing useful work because, after the user selects a particular vehicle from the onboard commercial vehicle database and selects the specific points on the vehicle chassis to be measured and places targets on these points, operation of the vehicle measuring system 10 is fully automatic.

There is only one listener, that is, subscriber, to the embedded system 513, which is a de-multiplexing adapter, which receives all events from the embedded system 513 and delivers single events to the relevant proxy object.

To avoid blocking the user interface thread, many embedded engine events are converted into UI-library specific event types, to be queued within the user interface library's own message queue. Asynchronous proxy-object events are implemented using Trap objects, which use synchronous listener interfaces and provide conditions variables for asynchronous signaling.

Computer software utilizing well-know programming techniques, the specific structures discussed and illustrated above employing the law of sines and single value decomposition standards for multiplying matrices, in conjunction with information from the small. on-board microprocessors associated with each of the encoders 116, 120, i.e., the engine 513, are utilized to determine the position of undercarriage measuring unit 58 and the cameras 64, 66, 68 and the angle of rotation of the cameras 64, 66, 68. Standard infrared signals from each target probe 284 signal to the control module 122 the length of any particular probe. Two of the cameras move through an iteration process of searching for alternating black and white bands on the targets, seeking the center of each target through well-known techniques and when it appears to the control module or computer 72 that both relevant cameras are focused on the center of a target, an electromagnetic signal in the form of a query is sent to the target believed to have been selected, instructing it to flash its light emitting diodes 304 repeatedly, providing bursts of bright light that are perceived by the cameras and associated computers as confirmation of acquisition of a particular target. The location of that target is then calculated utilizing triangulation through the law of sines or otherwise and that location is compared with the design location in a database stored on the computer 72, with the difference being defined as three dimensional vector. A simple vector subtraction routine then determines the distance and direction that the actual targeted reference point deviates from the designed position for that same reference point. The vehicle 16 is then pulled by hydraulically actuated chains or the like fastened to pulling points on the vehicle 16 (not shown as they do not have direct connection to the vehicle measuring system 10 disclosed herein) for some distance and then the target location is measured again; the vehicle is pulled some more and the reference point re-measured and so forth until the reference points have been restored to their original designed locations. This process is repeated until all vehicle reference points are restored to their original design specifications in relation to a point of origin on the vehicle.

While the present invention has been described in accordance with the preferred embodiments thereof, the description is for illustration only and should not be construed as limiting the scope of the invention. Various changes and modifications may be made by those skilled in the art without departing from the spirit and scope of the invention as defined by the following claims.

We claim:

1. An apparatus for detecting a target point for measurement, the apparatus comprising:
    a track assembly configured for placement underneath a vehicle;
    a frame assembly comprising a cross member perpendicular to the track assembly and located above the vehicle;
    a first measuring unit mounted on the cross member, the first measuring unit comprising at least two cameras and means for independently rotating each of the at least two cameras;
    a second measuring unit mounted on the track assembly, the second measuring unit comprising at least two other cameras and means for independently rotating each of the at least two other cameras;
    a processor configured to selectively control the movement of at least one of:
        the first measuring unit along the cross member for alignment with the target point on the vehicle; and
        the second measuring unit along the track assembly for alignment with the target point on the vehicle; and
    the processor further configured to selectively control rotation of at least one of:
        the at least two cameras to detect the target point; and
        the at least two other cameras to detect the target point.

2. The apparatus of claim 1 wherein the processor controls the rotation of each of the at least two cameras until the at least two cameras are centered on the target point, and wherein the processor further:
    receives a position signal from the first measuring unit indicating a position of the first measuring unit along the cross member;
    receives a rotational signal from each of the at least two cameras indicating a rotational position of each corresponding camera;

calculates an absolute position of the target point based on the position signal and the rotational signals; and compares the absolute position to a desired position to determine a distance and direction of displacement of the target point from the desired position.

3. The apparatus of claim 2 wherein the rotational signal includes rotational position data, and wherein the processor applies the law of sines to the rotational position data to determine a location of the target point and employs vector subtraction to generate a three-dimensional vector designating the displacement of the target point from the desired position.

4. The apparatus of claim 1 wherein the processor controls the rotation of each of the at least two other cameras until the at least two other cameras are centered on the target point, and wherein the processor further:

receives another position signal from the second measuring unit indicating a position of the second measuring unit along the track assembly;

receives another rotational signal from each of the at least two other cameras indicating a rotational position of a corresponding other camera;

calculates an absolute position of the target point based on the other position signal and the other rotational signals; and compares the absolute position to a desired position to determine a distance and direction of displacement of the target point from the desired position.

5. The apparatus of claim 4 wherein the other rotational signals include rotational position data, and wherein the processor employs the law of sines to the rotational position data included the other rotational signals to locate the target point and employs vector subtraction to generate a three-dimensional vector designating the displacement of the target point from the desired position.

6. The apparatus of claim 1 wherein the target point is located on a target assembly comprising:

a target stem comprising an upper end configured for attachment to a chassis of the vehicle;

a target frame mounted to a lower end of the target stem, the target frame comprising depending side walls; and a target assembly board pivotally connected between the sidewalls and comprising a target on a front face of the target assembly, the target comprising a plurality concentric rings of light and dark circular patterns.

7. The apparatus of claim 6 wherein the target assembly further comprises a signaling means for signaling to the at least two cameras or the at least two other cameras to indicate that a target point has been located for detection.

8. The apparatus of claim 7 wherein the signaling means further provides a unique identification code to the at least two cameras or the at least two other cameras, the unique identification code comprising at least an eight bit code and identifying manufacturing data for the vehicle.

9. The apparatus of claim 7 wherein the processor employs edge detection software to control the rotation of the at least two cameras to detect the target or to control the rotation of the at least two other cameras to detect the target.

10. The apparatus of claim 1 further comprising a light source associated with each of the at least two cameras and the at least two other cameras to illuminate the target point.

11. An apparatus for measuring comprising:

a track assembly configured for placement underneath a vehicle;

a frame assembly comprising a cross member perpendicular to the track assembly and located above the vehicle;

a lower carriage mounted on the track assembly, the lower carriage comprising at least two cameras and means for independently rotating each of the at least two cameras;

an upper carriage mounted on the cross member, the upper carriage comprising at least two other cameras and means for independently rotating each of the at least two other cameras; and a processor to:

selectively control movement of at least one of the lower carriage or the upper carriage, wherein the movement of the lower carriage is controlled along the track assembly for alignment with a target point on the vehicle, and wherein the movement of the upper carriage is controlled along the cross member for alignment with the target point; and selectively control a rotation of the at least two cameras to detect the target point or control a rotation of the at least two other cameras to detect the target point.

12. The apparatus of claim 11 wherein the processor controls the rotation of each of the at least two cameras until the at least two cameras are centered on the target point, and wherein the processor further:

receives a position signal from the lower carriage indicating a position of the lower carriage along the track assembly;

receives a rotational signal from each of the at least two cameras indicating a rotational position of each corresponding camera;

calculates an absolute position of the target point in response to the position signal and the rotational signals; and compares the absolute position to a desired position to determine a distance and direction of displacement of the target point from the desired position.

13. The apparatus of claim 11 wherein the processor controls the rotation of each of the at least two other cameras until the at least two other cameras are centered on the target point, and wherein the processor further:

receives another position signal from the upper carriage indicating a position of the upper carriage along the track;

receives another rotational signal from each of the at least two other cameras indicating a rotational position of a corresponding other camera;

calculates an absolute position of the target point in response to the position signal and the rotational signals; and compares the absolute position to a desired position to determine a distance and direction of displacement of the target point from the desired position.

14. The apparatus of claim 11 wherein the target point is located on a target assembly comprising:

a target stem comprising an upper end configured for attachment to a chassis of the vehicle;

a target frame mounted to a lower end of the target stem, the target frame comprising depending side walls; and a target assembly board pivotally connected between the sidewalls and comprising a target on a front face of the target assembly.

15. The apparatus of claim 14 wherein the target assembly further comprises a signaling means for signaling to the at least two cameras or the at least two other cameras to indicate that the target has been located for detection.

16. The apparatus of claim 15 wherein the signaling means further provides a unique identification code to the at least two cameras or the at least two other cameras, the unique identification code comprising at least an eight bit code and identifying manufacturing data for the vehicle.

17. A system for measuring a distance between a target point and a desired point, the system comprising:
a track assembly configured for placement underneath an item on which the target point is located;
a frame assembly comprising a cross member and perpendicular to the track assembly and located above the item;
a lower carriage mounted on said track assembly, the lower carriage comprising:
at least two cameras and means for independently rotating each of the at least two cameras, and wherein the lower carriage generates a position signal indicating a position of the lower carriage along the track assembly and a rotational position signal indicating a rotational position of each corresponding camera;
an upper carriage mounted on the cross member, the upper carriage comprising at least two other cameras and means for independently rotating each of at least two other cameras, and wherein the upper carriage generates another position signal indicating a position of the upper carriage along the track assembly and generates another rotational signal indicating a rotational position of each corresponding camera; and
a processor to:
selectively control movement of at least one of the lower carriage or the upper carriage, wherein the movement of the lower carriage is controlled along the track assembly for alignment with a target point, and wherein the movement of the upper carriage is controlled along the cross member for alignment with the target point;
selectively control the rotation of the at least two cameras to detect the target point or control the rotation of the at least two others cameras to detect the target point;
calculates an absolute position of the target point in response to the position signal and the rotational signals or in response to the other position signal and the other rotational signals; and
compares the absolute position to a desired position to determine a distance and direction of displacement of the target point from the desired position.

18. The system of claim 17 wherein the processor employs edge detection software to control the rotation of the at least two cameras to detect the target point or to control the rotation of the at least two other cameras to detect the target point.

19. The system of claim 17 wherein the target point is located on a target assembly comprising:
a target stem comprising an upper end configured for attachment to the item;
a target frame mounted to a lower end of the target stem, the target frame comprising depending side walls; and
a target assembly board pivotally connected between the sidewalls and comprising a target on a front face of the target assembly.

20. The system of claim 19 wherein the target assembly further comprises a signaling means for signaling to the at least two cameras or to the at least two other cameras to indicate that a target has been located for detection.

21. The system of claim 20 wherein the signaling means further provides a unique identification code to the at least two cameras or the at least two other cameras, the unique identification code comprising at least an eight bit code and identifying manufacturing data for the vehicle.

22. The system of claim 17 wherein the upper carriage comprises a rear camera bucket for holding a rear camera and a front camera bucket for holding a front camera.

23. The system of claim 17 wherein the lower carriage comprises three cameras.

24. The system of claim 17 further comprising a light source associated with each of the at least two cameras and at least two other cameras to illuminate the target point.

25. The system of claim 17 further comprising a memory for storing a desired position for a plurality of items.

* * * * *